(12) United States Patent
Suzuki et al.

(10) Patent No.: US 8,761,176 B2
(45) Date of Patent: Jun. 24, 2014

(54) PATH CONTROL METHOD ADAPTED TO AUTONOMOUS SYSTEM ROUTING PROTOCOL FOR COMMUNICATION NETWORK

(75) Inventors: Takaaki Suzuki, Tokyo (JP); Kazuya Suzuki, Tokyo (JP); Tomohiko Yagyu, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 96 days.

(21) Appl. No.: 12/496,566

(22) Filed: Jul. 1, 2009

(65) Prior Publication Data

US 2010/0002712 A1    Jan. 7, 2010

(30) Foreign Application Priority Data

Jul. 3, 2008    (JP) ................................. 2008-174873

(51) Int. Cl.
    *H04L 12/28*    (2006.01)

(52) U.S. Cl.
    USPC .......................................... 370/392; 370/389

(58) Field of Classification Search
    None
    See application file for complete search history.

(56) References Cited

U.S. PATENT DOCUMENTS

| | | | |
|---|---|---|---|
| 6,339,595 B1 * | 1/2002 | Rekhter et al. ................. | 370/392 |
| 6,963,575 B1 * | 11/2005 | Sistanizadeh et al. ......... | 370/404 |
| 6,968,393 B1 * | 11/2005 | Chen et al. ..................... | 709/242 |
| 7,274,704 B1 * | 9/2007 | Ould-Brahim et al. ........ | 370/409 |
| 7,474,629 B2 * | 1/2009 | Netravali et al. ............... | 370/254 |
| 7,508,829 B2 * | 3/2009 | Rangarajan et al. ........... | 370/392 |
| 7,633,874 B1 * | 12/2009 | Nalawade et al. ............. | 370/238 |
| 7,675,912 B1 * | 3/2010 | Ward et al. ..................... | 370/392 |
| 2003/0076838 A1 * | 4/2003 | Shaio et al. ................. | 370/395.5 |
| 2005/0068968 A1 * | 3/2005 | Ovadia et al. .................. | 370/396 |
| 2009/0296579 A1 * | 12/2009 | Dharwadkar et al. .......... | 370/235 |
| 2010/0002712 A1 * | 1/2010 | Suzuki et al. .................. | 370/401 |

FOREIGN PATENT DOCUMENTS

| | | | |
|---|---|---|---|
| JP | 2005167482 A | | 6/2005 |
| JP | 2005252857 A | | 9/2009 |

OTHER PUBLICATIONS

Y. Rekhter, et al., "A Border Gateway Protocol 4 (BGP-4)", Network Working Group, IETF RFC1771, Mar. 1995.
Y. Rekhter, et al., "A Border Gateway Protocol 4 (BGP-4)", Network Working Group, IETF RFC4271, Jan. 2006.

(Continued)

*Primary Examiner* — Robert Wilson
(74) *Attorney, Agent, or Firm* — Sughrue Mion, PLLC

(57) ABSTRACT

A path control method includes a procedure for developing a path control message including regional information in transmission on the network. The regional information designates a path and/or a path length for transmitting the path control message. The path control message includes a regional property for instructing each node as to how to process the regional information either in a strict manner or in a flexible manner. With reference to the regional information and/or the regional property, each node is capable of selecting a destination node to which the path control message is to be transmitted, stopping the further transmission of the path control message, or discarding the path control message.

12 Claims, 14 Drawing Sheets

(56) References Cited

OTHER PUBLICATIONS

Japanese Office Action for JP2008-174873 mailed on Sep. 4, 2012.
Japanese Office Action for JP2008-174873 mailed on May 8, 2012.
Oliver Bonaventure et al., "Controlling the redistribution of BGP routes <draft-ietf-grow-bgp-redistribution-00.txt>", Internet Engineering Task Force, Internet Draft, [Internet], URL:<http://tools.ietf.org/id/draft-ietf-grow-bgp-restribution-00.txt>, [retreaved on Apr. 9, 2012], pp. 1-15. JP Office Action (JP Application No. 2008-174873, mailed on May 8, 2012), dated Apr. 2003.
Hisashi Kojima et al., "Recent Aspects of MPLS technology", Journal of IEICE, vol. 84, No. 8, Japan, The Institute of Electronics, Information and Communication Engineers, Aug. 1, 2001, pp. 602-605. See doc 2 on 2 of translated JPOA (JP Application No. 2008-174873, mailed on May 8, 2012) for explanation of relevance, dated 2001.

* cited by examiner

PATH CONTROL METHOD ADAPTED TO AUTONOMOUS SYSTEM ROUTING PROTOCOL FOR COMMUNICATION NETWORK

The present application claims priority on Japanese Patent Application No. 2008-174873, the content of which is incorporated herein by reference.

BACKGROUND OF THE INVENTION

1. Field of the Invention

The present invention relates to path control methods adapted to autonomous system routing protocols for communication networks such as the Internet. The present invention also relates to path control systems and devices as well as path control programs.

2. Description of the Related Art

Path control protocols used for the Internet are classified into interior gateway protocols (IGP) performing path control procedures inside autonomous systems, and exterior gateway protocols (EGP) performing path control procedures between autonomous systems. Autonomous systems (AS) are networks each of which is managed by use of a single policy, wherein they are related to enterprise networks, internet service providers (ISP), or the like. The backbones of the Internet are roughly composed of intra-AS networks (each managed by a single policy) and inter-AS networks (each formed between autonomous systems).

In addition to the EGP, border gateway protocols (BGP) have been used for the Internet and disclosed in various documents such as Non-Patent Documents 1 and 2, which teach path-vector control protocols used for reception/transmission of the path control information (e.g. network addresses, AS numbers, AS path attributes, etc.) between autonomous systems, wherein UPDATE messages are included in the path control information for use in the path control procedure of the BGP.

Non-Patent Document 1: "Border Gateway Protocol 4 (BGP-4)", IETF RFC1771, March 1995

Non-Patent Document 2: "Border Gateway Protocol 4 (BPG-4)", IETF RFC4271, January 2006

FIG. 17 shows a part of a packet format of an UPDATE message, which includes a path attribute full length 920, path attribute information 921, and network reachability information 922.

The path attribute full length 920 configured of two octets indicates data representing a variable length of the path attribute information 921. The path attribute information 921 includes at least an ORIGIN attribute, an AS path attribute, and a NEXT HOP address. It is possible to change the number of elements included in the path attribute information 921 with respect to each UPDATE message; hence, the path attribute information 921 has a variable length. The network reachability information 922 includes a prefix bit of an address of a network that is reachable by the present autonomous system. It is possible to incorporate a plurality of prefix bits into a single UPDATE address; hence, the network reachability information 922 has a variable length.

The path attribute information 921 includes a well-known attribute (which is requisite for any BGP router to recognize) and an option attribute (which is requisite for a prescribed BGP router to recognize). For example, the ORIGIN attribute, the AS path attribute, and the NEXT HOP address are regarded as well-known attributes which are requisite for any BGP router to recognize, while newly and arbitrarily added attributes are regarded as option attributes which are requisite for prescribed BGP routers to recognize.

When a transmission flag is set to the path attribute information 921 including an option attribute, the option attribute is attached to an UPDATE message being transmitted to a peer. When a transmission flag is not set to the path attribute information 921, the option attribute is not attached to the UPDATE message being transmitted to a peer. When a BGP router incapable of recognizing any option attribute receives an UPDATE message accompanied with a transmission flag, the BGP router neglects the option attribute by itself but attaches the option attribute to the UPDATE message being transmitted to a peer.

According to the path-vector control protocol such as the BGP, each autonomous system is informed of a path to another autonomous system on the network with reference to an UPDATE message. In a packet transfer procedure, each autonomous system determines a next-hop autonomous system corresponding to a destination address of a packet and then transfers the packet to the next-hop autonomous system. Thus, it is possible to transfer packets from one device (corresponding to a source address) to another device (corresponding to a destination address).

The path control procedure of the BGP preferentially designates a path having a minimum number of hops (or a minimum AS-path length) while arbitrarily selecting other paths with reference to various policies. Herein, policies adapted to autonomous systems include decisions as to whether to permit connections with adjacent autonomous systems or decisions as to which connections are to be preferentially used, wherein they are autonomously determined by autonomous systems.

BGP routers are used to perform transactions of the path control information by way of the path control procedure of the BGP. Autonomous systems are networks each managed by a single policy and are formed using various routers, end-user terminals, etc. Among routers forming autonomous systems, BGP routers are used to perform communications between autonomous systems in accordance with the BGP. For the sake of simplification of the description, each autonomous system is presumably equivalent to a single BGP router unless any distinction is defined between the autonomous system and the router.

A packet transfer procedure will be described in connection with a path control procedure of a path-vector control protocol. FIG. 18 is a diagram used for explaining a packet transfer procedure adapted to the path control procedure of the path-vector control protocol. Specifically, FIG. 18 shows an example of an inter-AS network topology (or a BGP network topology) applied between autonomous systems performing transactions of the path control information by way of reception/transmission of UPDATE messages. Herein, each circle designates each autonomous system (AS), and each line laid between circles designates a connection between autonomous systems.

The number assigned to each circle is an AS number which is uniquely assigned to each AS on the network. In actual communications over the Internet, globally unique numbers are assigned to AS numbers. In this connection, an autonomous system whose AS number is "1" is designated by a reference symbol "AS1"; hence, FIG. 18 includes seven autonomous systems, namely, AS1 to AS7.

Rectangular blocks attached to circles (designating prescribed autonomous systems) designate node path tables 930 to 935, which are stored in memories of prescribed autonomous systems (i.e., BGP routers). Specifically, they designate the AS path information with respect to a prefix of address "192.170.0.0/16" issued by the AS1. The upper portions of the node path tables 930 to 935 show full paths stored in prescribed autonomous systems with respect to the prefix of address "192.170.0.0/16", while the lower portions thereof show packet transfer destinations (i.e. next hops) via best paths (each having a minimum number of hops) with respect to the prefix of address "192.170.0.0/16".

When the AS6 receives a packet with respect to the prefix of address "192.170.0.0/16", the AS6 consults the node path table 934 so as to designate the AS5 as the packet transfer destination with respect to the prefix of address "192.170.0.0/16". Thus, the AS6 transfers a packet to the AS5 with respect to the prefix of address "192.170.0.0/16" (see an arrow 940 in FIG. 18).

Upon reception of the packet from the AS6, the AS5 consults the node path table 933 so as to designate the AS4 as a transfer destination of the packet with respect to the prefix of address "192.170.0.0/16". Then, the AS5 transfers the packet to the AS4. According to similar procedures, the AS4 transfers the packet from the AS5 to the AS1.

Upon reception of the packet from the AS4, the AS1 acknowledges that the transfer destination of the packet is directed to the prefix of address "192.170.0.0/16" which is issued by itself, hence, the AS1 accepts the packet.

As described above, best paths are determined based on the path control information, and transfer destinations of packets are used as the routing information, thus completing transfer procedures of packets from source nodes to destination nodes.

In the path control procedure of the path-vector control protocol for transferring packets in accordance with the path control information that is managed based on the path attribute information (e.g. the path length), autonomous systems are informed of paths toward other nodes on the network by way of transactions of the path control information. Herein, autonomous systems repeat sending UPDATE messages of the BGP to adjacent autonomous systems in accordance with their policies, thus spreading UPDATE messages over the network. Hereinafter, spreading UPDATE messages will be referred to as "global notification".

The existing Internet suffers from the increasing amount of path control information. In particular, inter-AS networks suffer from the increasing amount of path control information due to multi-homing and traffic engineering (referred to as "TE"). Multi-homing refers to each autonomous system transferring an UPDATE message regarding the same prefix of address over the network via connections established with other autonomous systems, thus achieving traffic dispersions and improving contingency resistance by way of plural paths directed to the prefix of the address. Traffic engineering (TE) refers to each autonomous system spreading fragments of one prefix of address over the network via connections established with other autonomous systems, thus achieving traffic dispersions and improving security. Recently, multi-homing and traffic engineering have been frequently used in the existing Internet requiring high security and high-speed communications. On the other hand, they increase the scale of path information databases of routers and also increase UPDATE messages transferred between autonomous systems.

Next, the technical feature of traffic engineering-will be described in conjunction with increasing UPDATE messages. FIG. 19 is a diagram used for explaining the technical feature of traffic engineering and the increasing UPDATE message. Similar to FIG. 18, FIG. 19 shows connections between seven autonomous systems, i.e. AS1 to AS7. The AS1 globally notifies the AS2 and AS4 with the prefix of address "192.170.0.0/16" by way of multi-homing on the network shown in FIG. 19. The following description is made under a precondition in which the AS1 performs an address control procedure so as to receive traffic directed to the prefix of address "192.170.0.0/16" from the AS2. In this connection, the logical sum between "192.170.0.0/17" and "192.170.128.0/17" goes to "192.170.0.0/16".

The AS1 sends an UPDATE message of the prefix of address "192.170.128.0/17" to the AS2 serving as a peer of the AS1 via a dotted arrow 950 in FIG. 19, thus globally notifying it over the network. This makes it possible for the AS1 to receive traffic directed to the prefix of address "192.170.128.0/17" from the AS2.

The above traffic engineering is applied to the AS1 for the purpose of the reception of traffic directed to the prefix of address "192.170.128.0/17" from the AS2. It is not directly aimed at the load balance and traffic control in the inter-AS network following the AS2. The UPDATE message used for traffic engineering should be increased due to the global notification toward other autonomous systems following the AS2. This likely causes the UPDATE message exceeding a prescribed value requisite for traffic engineering to flow over the inter-AS network. Increasing the UPDATE message imposes additional loads to path processing of each autonomous system and makes the network unstable due to incomplete convergence of the path control information in each autonomous system. In addition, notifying numerous fragmentations of the prefix of address over the network increases the scale of path information databases of routers.

In the above circumstances, the present inventors have recognized that the path control procedures of path control protocols increase UPDATE messages so as to impose additional loads to routers of autonomous systems, thus making the path control information unstable. The "unstable" path control information may cause improper routing operations so as to prevent packets from reliably reaching destination nodes, thus causing packet losses. In addition, it increases the scale of path information databases of routers, which in turn increases loads to routers.

One reason for increasing UPDATE messages is related to the path control method employing traffic engineering. Normally, traffic engineering intends to circumscribe the path control range thereof to only the peers of autonomous systems. The conventional path control procedures of path control protocols globally notify UPDATE messages over the network in order to control traffics of peers. This increases UPDATE messages and also increases processing loads of routers in autonomous systems, thus making the network unstable.

SUMMARY

The invention seeks to solve the above problem, or to rectify the problem at least in part.

The present invention is directed to a path control method, a path control system, a path control device, and a path control program, all of which are designed to reduce the load for processing path control messages, thus preventing path information databases from being increased in scale and thus stabilizing the network.

Specifically, the path control method includes a procedure for developing a path control message including the regional information in transmission on the network The path control system implements the procedure for developing the path control message including the regional information.

The path control device is designed to develop the path control message including the regional information.

The path control program causes a computer to implement the procedure for developing the path control message including the regional information.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF PREFERRED EMBODIMENTS

Figure 1:
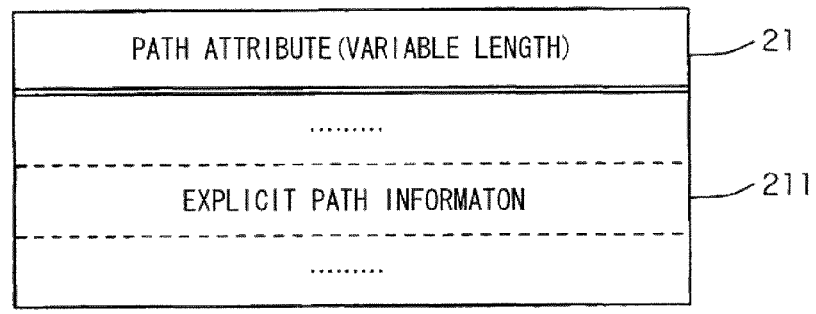
FIG. 1 shows a part of a packet format of an EXPLICIT UPDATE message including the explicit path information.

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

The present invention is related to UPDATE messages and processing of UPDATE messages in publication of paths over the network. Although the present invention is not necessarily limited to traffic engineering, the preferred embodiments thereof are directed to UPDATE messages subjected to traffic engineering and processing of those UPDATE messages. In addition, the preferred embodiments are related to procedures for controlling inter-AS paths on the network based on the border gateway protocol (BGP); but this is not a restriction. It is possible to reconfigure the preferred embodiments in conformity with general path control procedures for networks.

The present invention is related to the path control system using path control messages within a designated region. The present invention is also related to the communication method and the communication system as well as nodes and programs. In particular, the present invention controls path control messages to be delivered to a limited region, thus achieving traffic engineering for controlling traffics at prescribed nodes (e.g. autonomous systems or routers) by simply updating the explicit path information.

The present invention is outlined in such a way that, in the system or device employing the path control method, a transmission node handles an UPDATE message including the explicit path information for designating the region and destination in transmission, while a repeater node is controlled to relay the UPDATE message to the region and destination designated by the explicit path information.

The explicit path information is classified into two types of information as follows:

(1) EXPLICIT PATH: the information designating the region in transmitting an UPDATE message.
(2) EXPLICIT PATH LENGTH: the information limiting the region in transmitting an UPDATE message by way of the number of hops in transferring.

The system or device employing the path control method handles an UPDATE message including the additional information featuring the explicit path information, so that the UPDATE message is transmitted in accordance with the explicit path information.

The additional information regarding the explicit path is classified into four types of information as follows:

(1-1) UNICAST information indicating that the explicit path is a unicast message.
(1-2) MULTICAST information indicating that the explicit path is a multicast message.
(1-3) STRICT information for instructing an UPDATE message to be transmitted along the designated explicit path.
(1-4) LOOSE information allowing a repeater node to arbitrarily determine a repeater path or node other than a path or node designated by the explicit path.

The additional information regarding the explicit path length is classified into two types of information as follows:
(2-1) STRICT information for instructing an UPDATE message to be transmitted in accordance with the number of hops in a limited region.
(2-2) LOOSE information for permitting the stoppage in transmitting an UPDATE message in accordance with the number of hops in a limited region.

1. First Embodiment

A first embodiment of the present invention will be described with respect to the node structure, the node operation, and the networking process in relation to UPDATE messages. The path control system of the first embodiment is characterized in that a repeater node handles the limited transmission of UPDATE messages in accordance with the explicit path information (details of which will be described later). Due to the limited transmission, it is possible to suppress increasing UPDATE messages due to traffic engineering and path control procedures.

The first embodiment exploits the explicit path information (i.e. the information designating the region and destination for transmitting UPDATE messages) in order to suppress increasing UPDATE messages due to traffic engineering and path control procedures. In addition, the first embodiment also exploits EXPLICIT UPDATE messages, i.e. UPDATE messages including the explicit path information.

In the first embodiment, each autonomous system subjected to traffic engineering is controlled to transmit an EXPLICIT UPDATE message to a peer (or peers) within a limited region. Upon reception of the EXPLICIT UPDATE message, the autonomous system limits the region for transmitting an UPDATE message in accordance with the explicit path information included in the EXPLICIT UPDATE message.

FIG. 1 shows a part of a packet format of an EXPLICIT UPDATE message, which includes path attribute information 21. The path attribute information 21 further includes explicit path information 211.

The explicit path information 211 of the EXPLICIT UPDATE message includes an explicit path for designating a path to transmit an UPDATE message and an explicit path length for designating the number of hops in transmitting the UPDATE message via autonomous systems. Upon reception of the UPDATE message, the autonomous system makes a decision as to whether or not the UPDATE message includes the explicit path information 211. The autonomous system regards the UPDATE message including the explicit path information 211 as an EXPLICIT UPDATE message, thus transmitting the UPDATE message in a limited region. In contrast, the autonomous system simply transmits the UPDATE message not including the explicit path information 211 without limiting the region.

Figure 2:
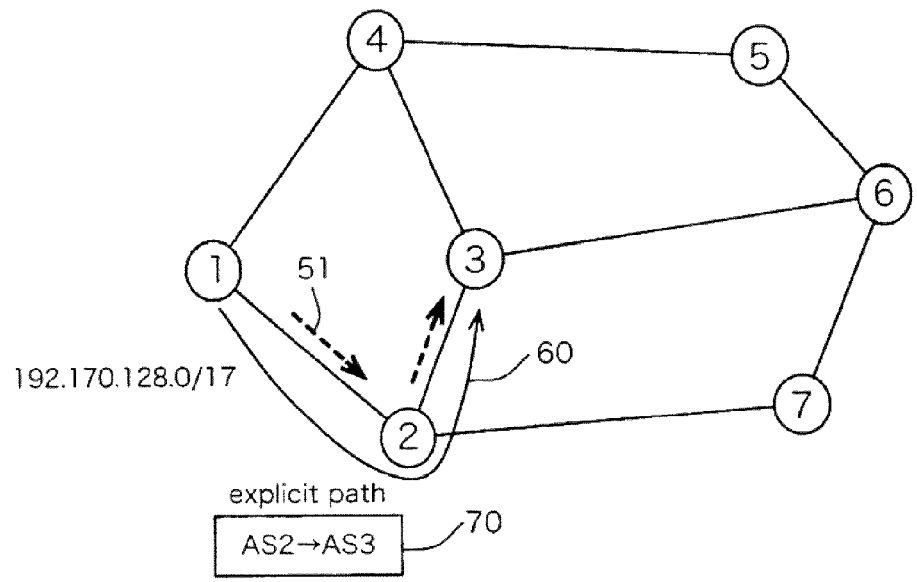
FIG. 2 is a diagram showing a network configured to transmit an EXPLICIT UPDATE message in accordance with an explicit path designated by the explicit path information.

FIG. 2 shows a network configured to transmit an EXPLICIT UPDATE message in accordance with an explicit path designated by the explicit path information 211. In FIG. 2, seven circles with the numbers "1" to "7" denote nodes (i.e. AS1 to AS7), each of which is configured of a single router or an autonomous system including plural routers. In this connection, each node operates similar to a single router.

In FIG. 2, a curved arrow 60 designates a transmission path along which the AS1 intends to transmit an EXPLICIT UPDATE message. That is, the AS1 intends to transmit the EXPLICIT UPDATE message along the transmission path of AS1→AS2→AS3. Dotted arrows 51 designate the directions for actually transmitting the EXPLICIT UPDATE message.

The AS1 sends an EXPLICIT UPDATE message 70, which describes an explicit path of AS2→AS3 with respect to the prefix of address "192.170.128.0/17", to the AS2 (see the dotted arrow 51 in FIG. 2). The AS2 specifies the AS3 as a destination node based on the explicit path described in the explicit path information 211 included in the EXPLICIT UPDATE message 70. The AS2 sends the EXPLICIT UPDATE message to the AS3. Based on the explicit path of the explicit path information 211 included in the EXPLICIT UPDATE message 70, the AS2 acknowledges itself as the destination node so as to stop the further transmission of the EXPLICIT UPDATE message 70. That is, the AS3 is controlled to stop further transferring of the EXPLICIT UPDATE message 70 to another node.

Figure 3:
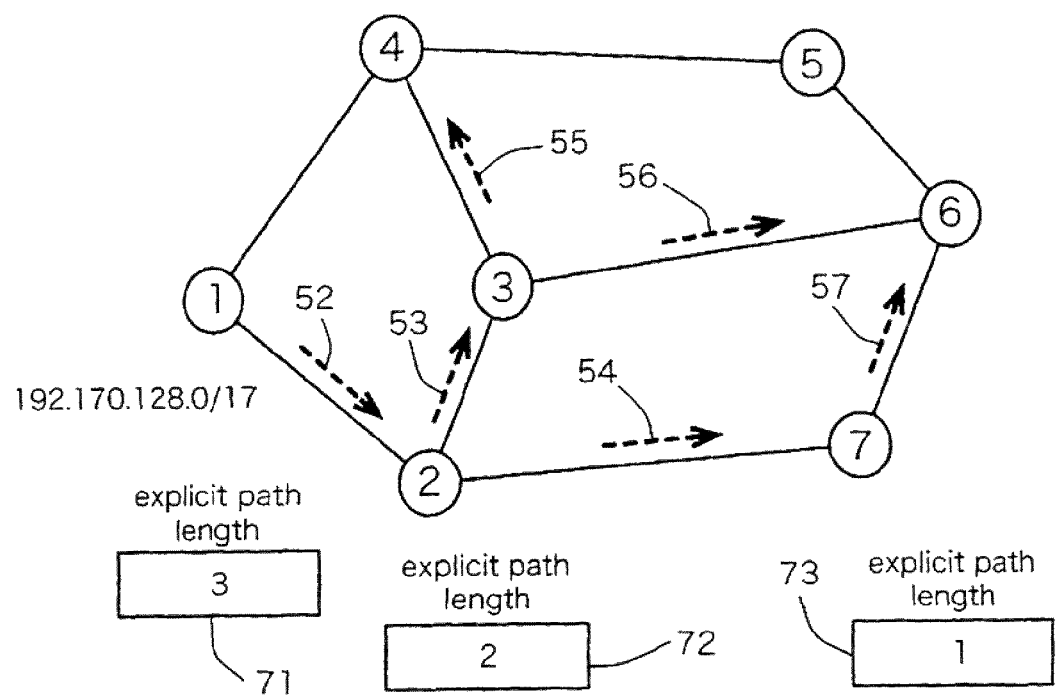
FIG. 3 is a diagram showing a network configured to transmit an EXPLICIT UPDATE message in accordance with an explicit path length designated by the explicit path information.

FIG. 3 shows a network configured to transmit an EXPLICIT UPDATE message in accordance with the explicit path length designated by the explicit path information 211, wherein dotted arrows 52 to 57 indicate the actual directions for transmitting the EXPLICIT UPDATE message.

In order to perform traffic engineering, the AS1 develops an EXPLICIT UPDATE message 71 including the explicit path information 211 indicating the explicit path length "3". The AS1 sends the EXPLICIT UPDATE message 71 to the AS2 (see the dotted arrow 52 in FIG. 3).

The AS2 updates the EXPLICIT UPDATE message 71 by decrementing the explicit path length, thus developing an EXPLICIT UPDATE message 72. Then, the AS2 sends the EXPLICIT UPDATE message 72 to the AS3 and AS7 serving as the peers of the AS2 (see the dotted arrows 53 and 54).

Both the AS3 and AS7 update the EXPLICIT UPDATE message 72 by decrementing the explicit path length, thus developing an EXPLICIT UPDATE message 73. Then, the AS3 sends the EXPLICIT UPDATE message 73 to the AS4 and AS6 serving as the peers of the AS3 (see the dotted arrows 55 and 56). In addition, the AS7 sends the EXPLICIT UPDATE message 73 to the AS6 serving as the peer of the AS7 (see the dotted arrow 57).

Both the AS4 and AS6 decrement the explicit path length of the EXPLICIT UPDATE message 73, which is thus decreased to "0". Thus, the AS4 and AS6 acknowledge themselves as the destination nodes so as to stop the further transmission of the EXPLICIT UPDATE message 73. That is, the AS4 and AS6 are controlled to stop further transferring of the EXPLICIT UPDATE message 73 to other nodes.

The AS2, AS3, AS4, AS6, and AS7 determine the best paths based on the explicit paths designated by the EXPLICIT UPDATE messages 71, 72, and 73, thus determining the next hops.

Figure 4:
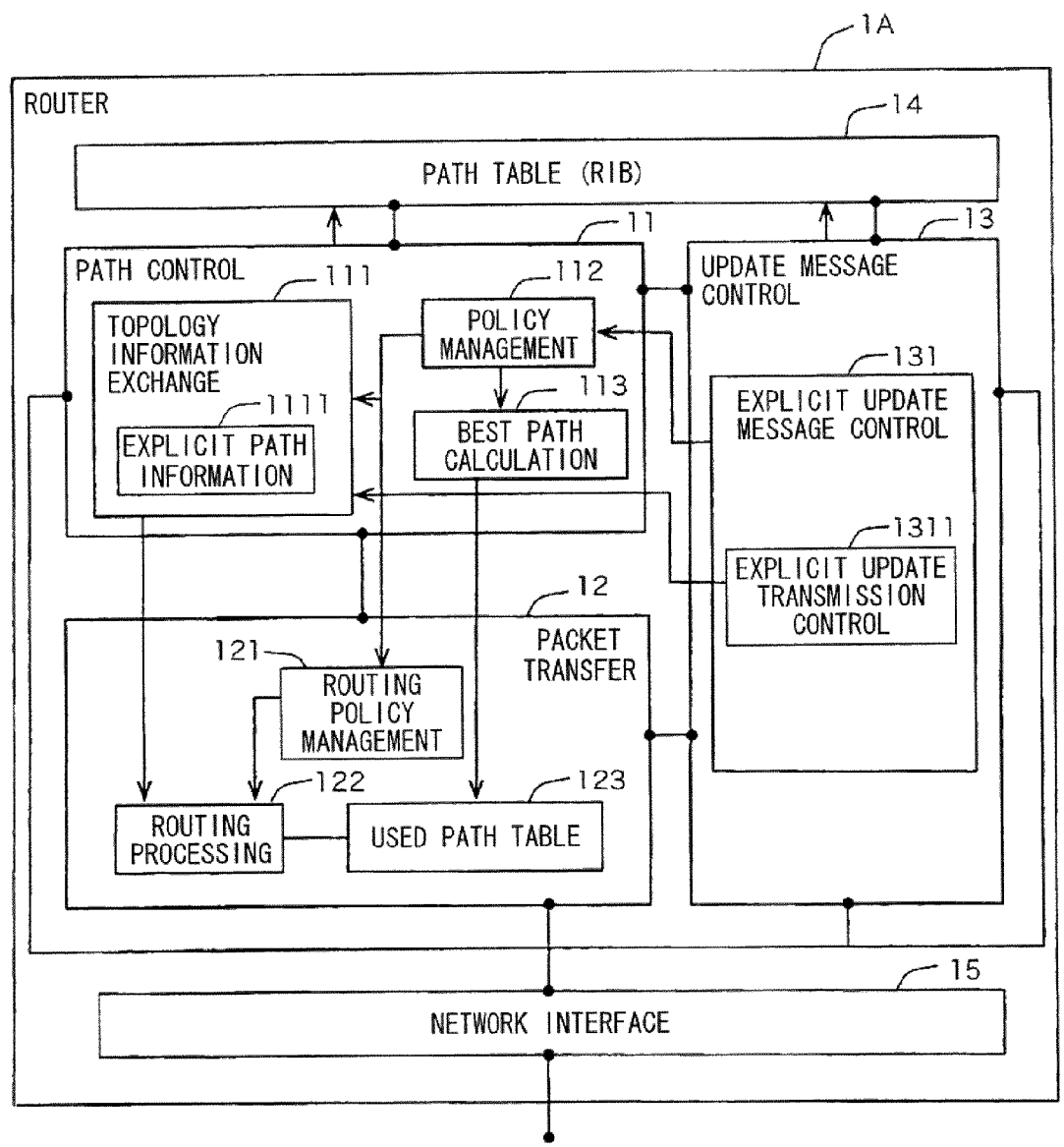
FIG. 4 is a block diagram showing the constitution of a router adapted to a path control system according to a first embodiment of the present invention.

FIG. 4 is a block diagram showing the constitution of a router 1A (or a routing control device) adapted to the path control system. Each of the autonomous systems included in the path control system is configured using the router 1A of FIG. 4, which is configured of a prescribed network device such as a BGP router. In this connection, it is possible to use an information processing device such as a personal computer installing a router function, which operates in accordance with programs.

In FIG. 4, the constituent elements which are mutually related to each other in terms of transactions of information and data are connected using solid lines and arrows; that is, each constituent element directly receives and transmits information and data with other constituent elements connected thereto via solid lines and arrows. In this connection, arrows indicate controls and references established between the mutually related constituent elements for the purpose of describing the technical features of the path control system.

The router 1A of FIG. 4 is constituted of a path control unit 11, a packet transfer unit 12, an UPDATE message transmission control unit 13, a path table (RIB: Routing Information Base) 14, and a network interface 15.

The path control unit 11 includes a topology information exchange section 111, a policy management section 112, and a best path calculation section 13. The topology information exchange section 111 further includes an explicit path information development section 1111.

The packet transfer unit 12 includes a routing policy management section 121, a routing processing section 122, and a used path table 123. The UPDATE message transmission control unit 13 includes an EXPLICIT UPDATE message control section 131, which further includes an EXPLICIT UPDATE transmission control section 1311.

The path table (RIB) 14 includes all pieces of path information with respect to destination nodes which are acquired, extracted, and modified based on UPDATE messages. The contents of the path table 14 are stored in a memory or the like incorporated into the router 1A.

The network interface 15 handles connections with adjacent routers (not shown), thus receiving and transmitting packets therewith.

In the path control unit 11, the topology information exchange section 111 exchanges the path information with an adjacent router (not shown) in accordance with the path-vector path control protocol such as the BGP. The topology information exchange section 111 instructs the routing processing section 122 to send the path information. The explicit path information development section 1111 included in the topology information exchange section 111 develops the explicit path information 211 to be described in an EXPLICIT UPDATE message.

The explicit path information 211 is classified into two types of information, which are developed by the explicit path information development section 1111 based on the path information of the path table 14, the information of an external terminal (not shown), and policy information managed by the policy management section 112.
(1) EXPLICIT PATH: the information indicating a path for transmitting an UPDATE message.
(2) EXPLICIT PATH LENGTH: the information indicating the region of an UPDATE message limited by the number of hops in transferring.

The topology information exchange section 111 does not necessarily include the explicit path information development section 1111 when the router 1A does not transmit an EXPLICIT UPDATE message.

The topology information exchange section 111 performs an exchange process of the path information by way of the reception/transmission of an UPDATE message or an EXPLICIT UPDATE message. The topology information exchange section 111 receives the path information from an adjacent router so as to store and retain it in the path table 14 (i.e. a memory of the router 1A).

The policy management section 112 manages the policy for selecting the path information to be stored in the path table 14 and the policy for selecting the best path with reference to the path table 14. Specifically, the policy management section 112 stores the policy information representing the above policies in the memory, and arbitrarily develops or updates it.

The policy management section 112 provides the routing policy management section 121 of the packet transfer unit 12 with the information for configuring the transmission policy of packets and the retrieval policy of the used path table 123. In addition, the policy management section 112 extracts or outputs the policy information in response to a reference request from the topology information exchange section 111.

The best path calculation section 113 calculates the best path suited to the prefix of the destination address based on the path information of the path table 14 and in accordance with the policy determined by the policy management section 112. In particular, the best path calculation section 113 determines the explicit path, which is prioritized by the policy of the policy management section 112, as the best path. The best path calculation section 113 registers the transmission destination information (i.e. the NEXT HOP information) in the best path with the used path table 123 included in the packet transfer unit 12.

The routing policy management section 121 included in the packet transfer unit 12 manages the routing policy based on the information transmitted thereto from the policy management section 112 of the path control unit 11. Specifically, the routing policy management section 121 stored the policy information representing the routing rule and policy in the memory, and arbitrarily develops and updates it.

The routing policy management section 121 provides the routing processing section 122 with the routing rule as necessary. For example, the routing policy management section 121 extracts the policy information representing the routing rule and policy from the policy management section 112 so as to transfer it to the routing processing section 122 upon its request.

The routing processing section 122 makes a decision as to whether or not the destination address designates the router 1A as the present node on the basis of a packet transmitted thereto from an adjacent router via the network interface 15 or a destination field corresponding to the header of a packet transferred thereto from the topology information exchange section 111 of the path control unit 11. When the destination address does not designate the router 1A as the present node, the routing processing section 122 retrieves a next destination address with reference to the used path table 123, thus transferring the received packet to another router designated by the next destination address. When the destination address designates the router 1A as the present node, the routing processing section 122 stops further transferring the received packet.

The used path table 123 stores the path information (or the transmission destination information) representing active paths which are presently used in connection with various destination addresses. The contents of the used path table 123 are stored in the memory of the router 1A. The used path table 123 is capable of storing the path information representing a plurality of active paths with respect to a single destination address. In this connection, the routing policy management section 121 controls the routing processing section 122 so as to appropriately use or manage the path information representing a plurality of active paths in the used path table 123.

The UPDATE message control unit 13 receives an UPDATE message from an adjacent router via the network interface 15. When the UPDATE message control unit 13 receives an EXPLICIT UPDATE message, the EXPLICIT UPDATE message control section 131 is activated to process it.

Based on the explicit path information 211 included in the received EXPLICIT UPDATE message, the EXPLICIT UPDATE transmission control section 1311 instructs the topology information exchange section 111 of the path control unit 11 to further transfer the EXPLICIT UPDATE message. When the EXPLICIT UPDATE message designates the router 1A as the present node, the EXPLICIT UPDATE transmission control section 1311 stops further transferring the EXPLICIT UPDATE message. That is, the EXPLICIT UPDATE transmission control section 1311 controls the topology information exchange section 111 to stop further transferring the EXPLICIT UPDATE message to another node.

The EXPLICIT UPDATE message control section 131 notifies the policy management section 112 of an explicit-path priority policy for prioritizing the explicit path information 211 in a packet transfer procedure.

The memory of the router 1A stores various programs for performing the path control on the communication network when the router 1A is configured of an information processing device. For example, the memory of the router 1A configured of the information processing device stores a path control program implementing the computer processing for developing a path control message including its regional information.

Figure 5:
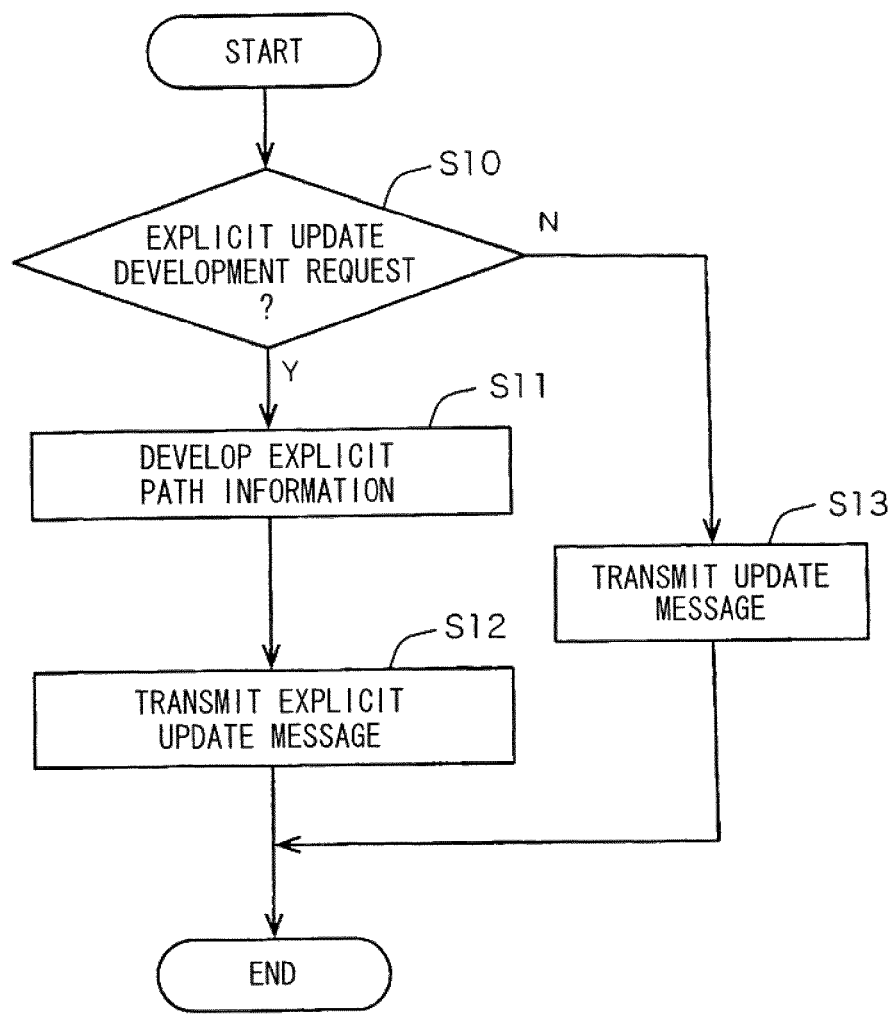
FIG. 5 is a flowchart used for explaining a part of the processing of the router for developing and transmitting an EXPLICIT UPDATE message.
Figure 6:
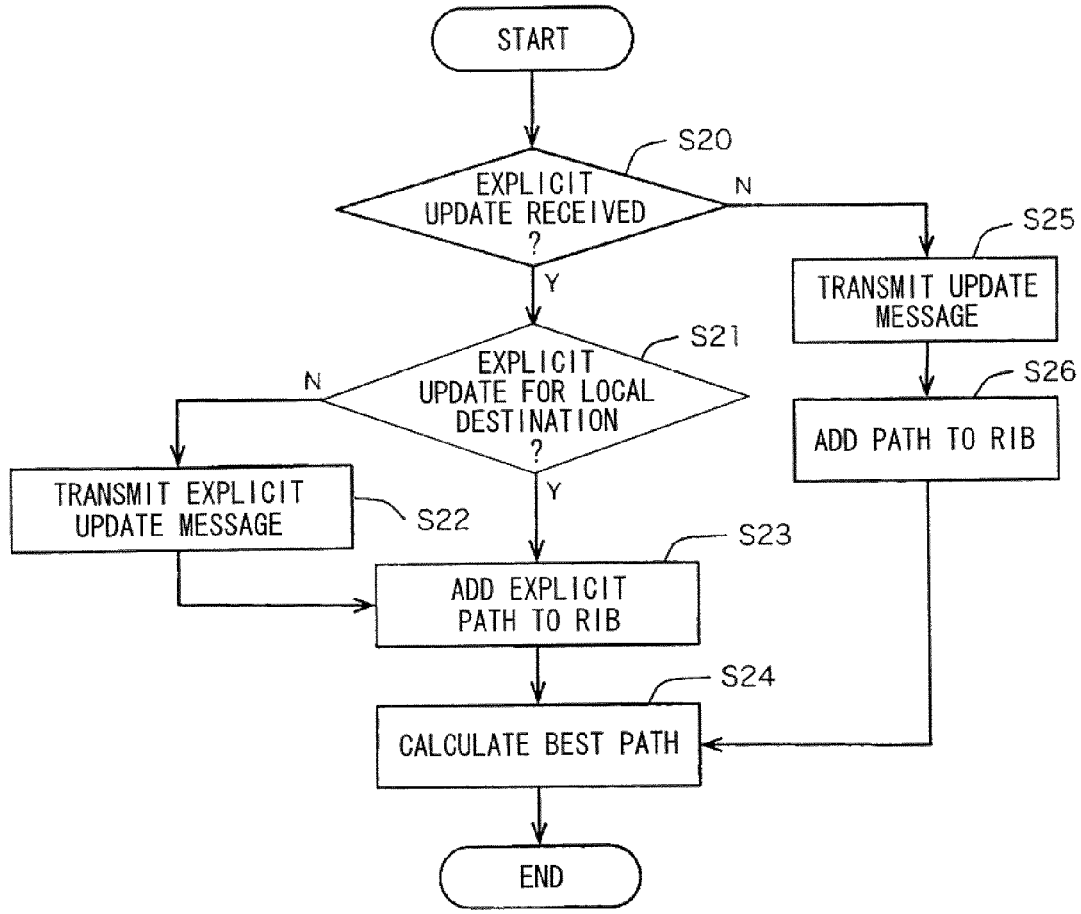
FIG. 6 is a flowchart used for explaining another part of the processing of the router for calculating a best path based on a received EXPLICIT UPDATE message.

Next, the detailed operation of the router 1A will be described with reference to FIGS. 5 and 6. FIGS. 5 and 6 are flowcharts used for explaining the EXPLICIT UPDATE message processing executed by the router 1A. FIG. 5 is a flowchart showing a part of the processing of the router 1A for developing and transmitting an UPDATE message or an EXPLICIT UPDATE message by way of traffic engineering. The overall operation of the router 1A in a normal mode is similar to the operations of conventional routers.

In traffic engineering (or upon an instruction for traffic engineering), the router 1A operates the topology information exchange section 111 of the path control unit 11 so as to make a decision whether to transmit an EXPLICIT UPDATE or an UPDATE messages in step S10. Upon a transmission request of the EXPLICIT UPDATE information, in other words, when the decision result of step S10 is "YES", the router 1A proceeds to step S11. Upon a transmission request of the UPDATE message, in other words, when the decision result of step S10 is "NO", the router 1A proceeds to step S13.

Upon the transmission request of the EXPLICIT UPDATE message, the explicit path information development section 1111 of the topology information exchange section 111 develops the explicit path information 211 representing the explicit path and the explicit path length in step S11. The topology information exchange section 111 develops and sends the EXPLICIT UPDATE message including the explicit path information 211 to a peer designated by the explicit path information 211 in step S12.

Without the transmission request of the EXPLICIT UPDATE message, the router 1A proceeds to step S13 for the transmission of the UPDATE message.

FIG. 6 is a flowchart showing a part of the processing of the router 1A receiving the EXPLICIT UPDATE message or the UPDATE message. The overall operation of the router 1A in a normal mode is similar to operations of conventional routers.

Upon reception of the EXPLICIT UPDATE message or the UPDATE message, the router 1A operates the UPDATE message control unit 13 so as to make a decision as to whether the router 1A receives the EXPLICIT UPDATE message or the UPDATE message in step S20. Upon reception of the EXPLICIT UPDATE message, in other words, when the decision result of step S20 is "YES", the router 1A proceeds to step S21. Upon reception of the UPDATE message, in other words, when the decision result of step S20 is "NO", the router 1A proceeds to step S25.

Upon reception of the EXPLICIT UPDATE message, the EXPLICIT UPDATE message control section 131 makes a decision as to whether or not the EXPLICIT UPDATE message designates the router 1A as the present node in step S21. When the decision result of step S21 is "YES" indicating that the router 1A is designated as a destination node, the router 1A proceeds to step S23. When the decision result of step S21 is "NO" indicating that the router 1A is not designated as a destination node, the router 1A proceeds to step S22.

When the EXPLICIT UPDATE message is not destined to the router 1A, the topology information exchange section 111 of the path control unit 11 proceeds to the transmission of the EXPLICIT UPDATE message in step S22. When the EXPLICIT UPDATE message is destined to the router 1A, the topology information exchange section 111 adds a new explicit path designated by the EXPLICIT UPDATE message to the path table 14, thus updating the contents of the path table 14 in step S23.

After completion of step S23 in which the new explicit path is added to the path table 14, the best path calculation section 113 of the path control unit 11 calculates a best path and a next hop with respect to the prefix of the destination address in step S24. The best path calculation section 113 registers the best path and the next hop with the used path table 123.

When the policy management section 112 presently manages the priority policy for a certain explicit path, the best path calculation section 113 selects such an explicit path as the best path in step S24. In this connection, the best path calculation section 113 is capable of calculating a plurality of best paths and next hops, which are registered with the used path table 123, with respect to the same prefix of the destination address. In this case, the routing processing section 122 of the packet transfer unit 12 selects one of the best paths and next hops for use in the transmission of the EXPLICIT UPDATE message.

Upon reception of the UPDATE message, the topology information exchange section 111 of the path control unit 11 proceeds to the transmission of the UPDATE message in step S25. The topology information exchange section 111 adds the path designated by the UPDATE message to the path table 14, thus updating the path table 14 in step S26. After completion of step S26, the router 1A proceeds to step S24.

In the first embodiment, the explicit path information limits the region for transmitting the UPDATE message by way of traffic engineering. This prevents the UPDATE message from being globally notified over the network. Thus, it is possible to reduce the total number of UPDATE messages subjected to transmission and to reduce the load for frequently changing the contents of the path table 14.

In the first embodiment, a source node transmits EXPLICIT UPDATE messages designating explicit paths by way of traffic engineering, thus reducing the total number of UPDATE messages subjected to transmission. Thus, it is possible to eliminate the necessity of globally notifying UPDATE messages by way of traffic engineering, thus stabilizing the network.

The first embodiment is designed such that repeater nodes for relaying UPDATE messages transferring UPDATE messages in limited regions designated by the explicit path information. This makes it possible to transmit UPDATE messages to limited regions and destinations based on the explicit path information included in UPDATE messages. Thus, it is possible to reduce the total number of UPDATE messages in traffic engineering and path publication and to reduce the load for the reception/transmission of UPDATE messages at nodes, thus stabilizing the network.

2. Second Embodiment

A second embodiment of the present invention differs from the first embodiment in that the EXPLICIT UPDATE message further includes the explicit path property (or path property) in addition to the aforementioned pieces of information shown in FIG. 1.

The explicit path property is an element for featuring the explicit path information, wherein the explicit path information would have different explicit path properties in connection with the explicit path and the explicit path length, as follows:

(1) Explicit path property for the explicit path of the path information
(1-1) UNICAST information indicating that the explicit path is a unicast message.
(1-2) MULTICAST information indicating that the explicit path is a multicast message.
(1-3) STRICT information for instructing an UPDATE message to be transmitted along the designated explicit path.
(1-4) LOOSE information allowing a repeated node or path to be arbitrarily determined other than a node or path designated by the explicit path.
(2) Explicit path property for the explicit path length of the explicit path information
(2-1) STRICT information instructing an UPDATE message to be transmitted by the designated number of hops which is regionally limited in transmission.
(2-2) LOOSE information instructing the stoppage of the transmission of an UPDATE message within the designated number of hops which is regionally limited in transmission.

When the explicit path information indicates the explicit path, it is possible to develop the explicit path property based on the combinations of unicast_strict (or uni_strict), unicast_loose (or uni_loose), multicast_strict (or multi_strict), and multicast_loose (or multi_loose). In the first embodiment, an EXPLICIT UPDATE message including the explicit path information indicating the explicit path serves as an EXPLICIT UPDATE message whose explicit path property indicates "unicast_strict".

Figure 7:
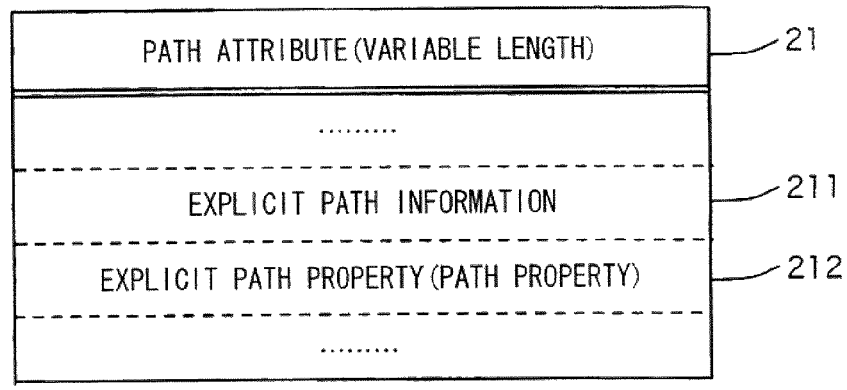
FIG. 7 shows a part of a packet format of an EXPLICIT UPDATE message including the explicit path property in addition to the explicit path information.

FIG. 7 shows a part of a packet format of an EXPLICIT UPDATE message according to the second embodiment. The second embodiment further includes the explicit path property (or path property) 212 in addition to the path attribute information 21 and the explicit path information 211.

Next, the propagation of an EXPLICIT UPDATE message which includes the explicit path information 211 indicating the explicit path and the explicit path property 212 indicating "unicast_loose" will be described with reference to FIG. 8.

Figure 8:
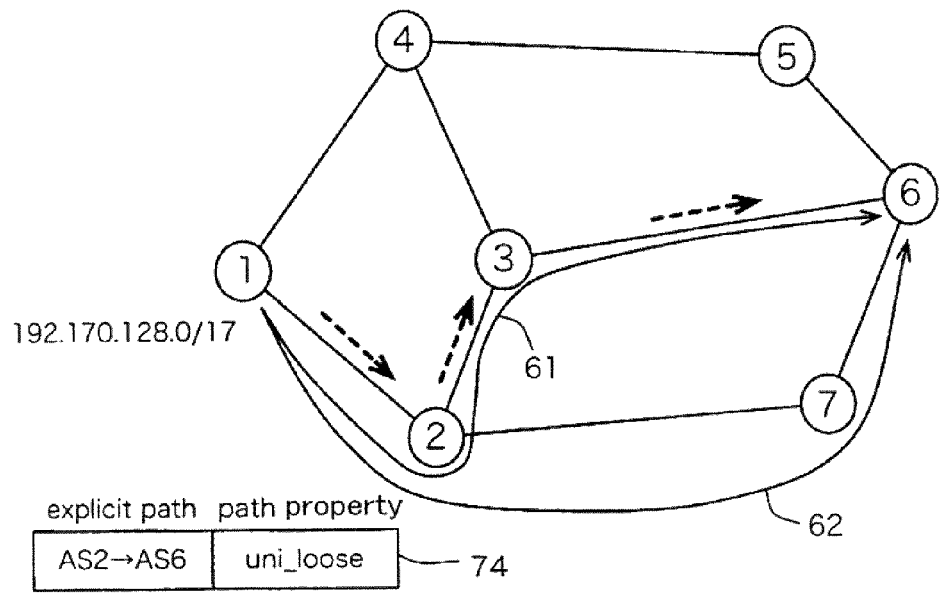
FIG. 8 shows a network configured to transmit an EXPLICIT UPDATE message which includes the explicit path information indicating the explicit path and the explicit path property indicating "unicast_loose"

In FIG. 8, the AS1 develops an EXPLICIT UPDATE message 74 by way of traffic engineering, wherein the AS1 designates the explicit path of AS2→AS6 while designating the explicit path property of uni_loose.

The explicit path property of uni_loose is designated for the "unicast" explicit path AS2→AS6 in that the EXPLICIT UPDATE message 74 should be transmitted through a single path via the AS2 toward the AS6, but a repeater node on the single path can be freely selected from prescribed nodes other than the AS2. In the case of FIG. 8, it is possible to set explicit paths 61 and 62 (see curved arrows), for example.

For example, the AS2 may select the explicit path 61 for transmitting the EXPLICIT UPDATE message 74 to the AS3 in accordance with its own policy. In this case, the AS2 transmits the EXPLICIT UPDATE message 74 to the AS3, which in turn transfer it to the AS6 along the explicit path 61.

By setting the explicit path property of uni_loose to the EXPLICIT UPDATE message 74 including the explicit path information indicating the explicit path, it is possible to arbitrarily select a repeater node based on the explicit path information. Even when an appropriate explicit path cannot be developed based on uni_strict due to some disturbance, it is possible to develop another explicit path toward the destination node.

Next, the propagation of an EXPLICIT UPDATE message which includes the explicit path information 211 indicating the explicit path and the explicit path property 212 indicating "multicast_strict" will be described with reference to FIG. 9.

Figure 9:
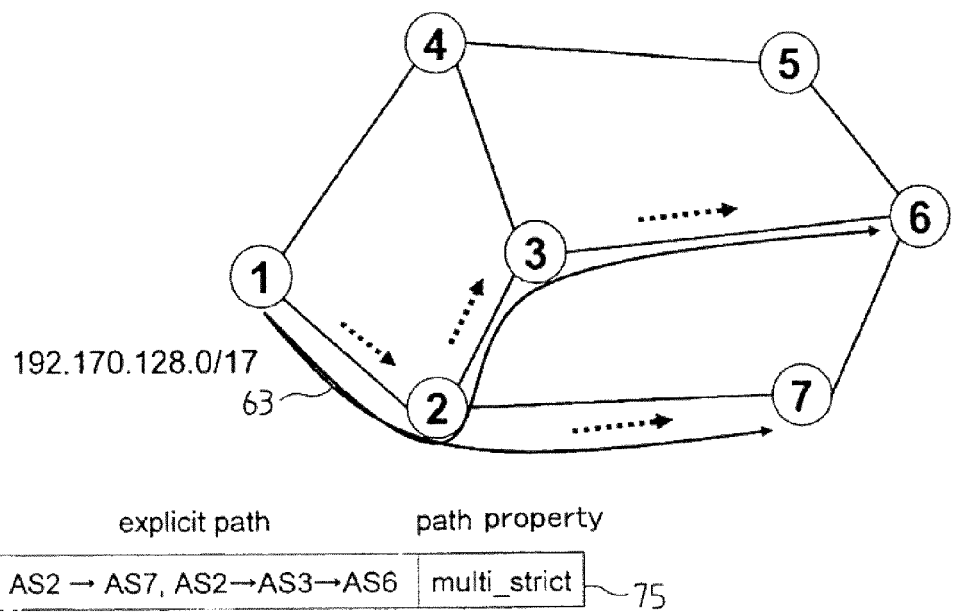
FIG. 9 shows a network configured to transmit an EXPLICIT UPDATE message which includes the explicit path information indicating the explicit path and the explicit path property indicating "multicast_strict"

In FIG. 9, the AS1 develops an EXPLICIT UPDATE message 75 in such a way that the AS1 designates two explicit paths for AS2→AS7 and AS2→AS3→AS6 while designating the explicit path property of multicast_strict (or multi_strict). FIG. 9 shows two explicit paths 63 (see curved arrows).

Upon reception of the EXPLICIT UPDATE message 75 from the AS1, the AS2 acknowledges the explicit path property of multi_strict so as to transfer it along the two explicit paths. Specifically, the AS2 transfers the EXPLICIT UPDATE message 75 to the AS3 along the explicit path of AS2→AS3→AS6, while the AS2 also transfers it to the AS7 along the explicit path of AS2→AS7.

The AS7 receives the EXPLICIT UPDATE message 75 from the AS2. In addition, the AS3 receiving the EXPLICIT UPDATE message 75 from the AS2 further transfers it to the AS6. Thus, the AS6 receives the EXPLICIT UPDATE message 75 from the AS3. The explicit paths 63 are developed by way of the above processing.

By setting the explicit path property of multi_strict to the EXPLICIT UPDATE message including the explicit path information indicating the explicit path, it is possible to develop a plurality of explicit paths in a strict manner. When the explicit path property is set to multi_loose, it is possible to develop a plurality of explicit paths in a flexible manner.

Next, the propagation of an EXPLICIT UPDATE message which includes the explicit path information indicating the explicit path length and the explicit path property indicating "loose" will be described with reference to FIG. 10.

Figure 10:
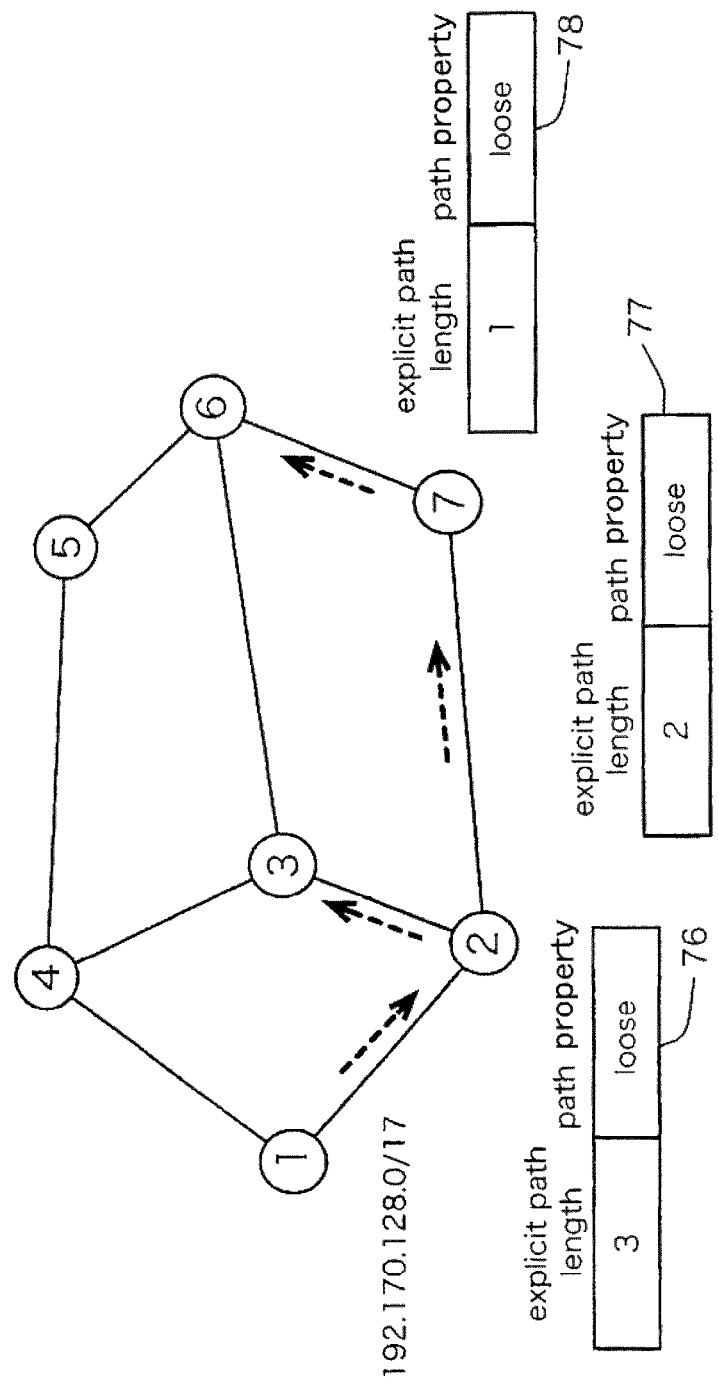
FIG. 10 shows a network configured to transmit an EXPLICIT UPDATE message which includes the explicit path information indicating the explicit path length and the explicit path property indicating "loose"

In FIG. 10, the AS1 develops an EXPLICIT UPDATE message 76 in which the explicit path length is set to "3", and the explicit path property is set to "loose". The AS1 transmits the EXPLICIT UPDATE message 76 to the AS2.

Upon reception of the EXPLICIT UPDATE message 76 from the AS1, the AS2 acknowledges that the explicit path information indicates the explicit path length of "3", and the explicit path property indicates "loose". In FIG. 10, the AS2 develops an EXPLICIT UPDATE message 77 by decrementing the explicit path length to "2". The AS2 transfers the EXPLICIT UPDATE message 77 to the AS3 and the AS7.

Upon reception of the EXPLICIT UPDATE message 77 from the AS2, the AS7 develops an EXPLICIT UPDATE message 78 by decrementing the explicit path length to "1". The AS7 transfers the EXPLICIT UPDATE message 78 to the AS6.

Upon reception of the EXPLICIT UPDATE message 78 from the AS7, the AS6 decrements the explicit path length to "0", thus terminating the further transmission of the EXPLICIT UPDATE message 78. That is, the AS6 is controlled to stop further transferring the EXPLICIT UPDATE message 78 to another node.

Upon reception of the EXPLICIT UPDATE message 77 from the AS2, the AS3 acknowledges that the explicit path length is set to "2" and that the explicit path property is set to "loose", although the AS3 is instructed to further transfer the EXPLICIT UPDATE message 78 to another peer. In this case, the AS3 neglects the explicit path length and stops the further transmission of the EXPLICIT UPDATE message 78. That is, the AS3 is controlled to stop further transferring the EXPLICIT UPDATE message 78 to another node.

By setting the explicit path property of "loose" to the EXPLICIT UPDATE message including the explicit path information indicating the explicit path length, it is possible for a repeater node to arbitrarily stop the further transmission of the EXPLICIT UPDATE message in a flexible manner.

Figure 11:
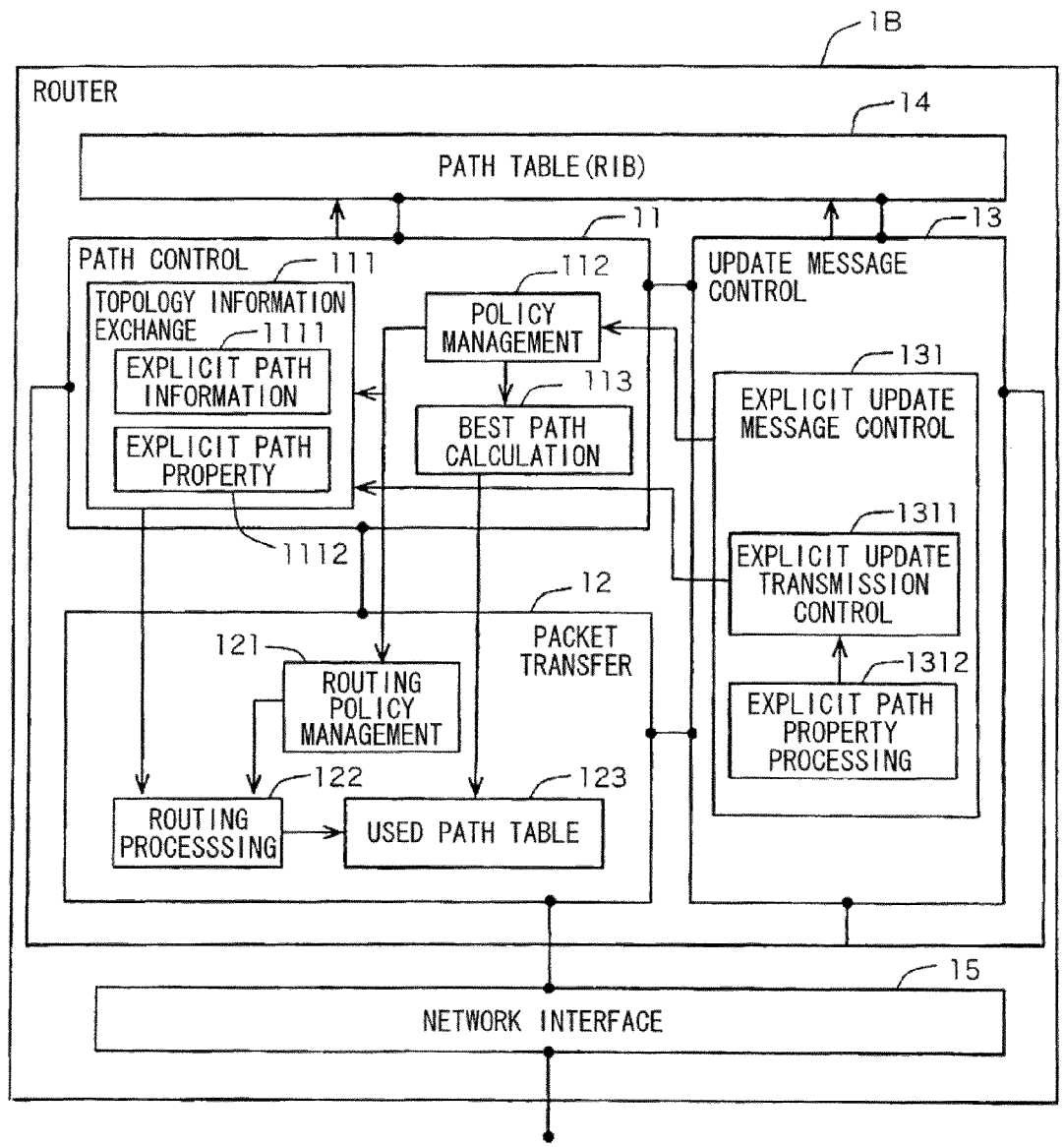
FIG. 11 is a block diagram showing the constitution of a router adapted to a path control system according to a second embodiment of the present invention.

FIG. 11 is a block diagram showing the constitution of a router 1B adapted to a path control system according to the second embodiment of the present invention. The router 1B of the second embodiment shown in FIG. 11 is similar to the router 1A of the first embodiment shown in FIG. 4 except that the topology information exchange section 111 of the path control unit 11 further includes an explicit path property development section 1112 for developing an explicit path property to be incorporated into an EXPLICIT UPDATE message, and the EXPLICIT UPDATE message control section 131 further includes an explicit path property processing section 1312 for processing the explicit path property.

In FIG. 11, the constituent elements which are mutually related to each other in terms of transactions of information and data are connected using solid lines and arrows; that is, each constituent element directly receives and transmits information and data with other constituent elements connected thereto via solid lines and arrows. In this connection, arrows indicate controls and references established between the mutually related constituent elements for the purpose of describing the technical features of the path control system.

In the router 1B, the topology information exchange section 111 of the path control unit 11 further includes the explicit path property development section 1112 in addition to the explicit path information development section 1111. The explicit path property development section 1112 develops an explicit path property prior to the transmission of an EXPLICIT UPDATE message, then, it incorporates the explicit path property into the EXPLICIT UPDATE message. Specifically, the explicit path property development section 1112 develops the explicit path property based on the information given from an external terminal (not shown), and the policy information managed by the policy management section 112.

The EXPLICIT UPDATE message control section 131 of the UPDATE message control unit 13 further includes the explicit path property processing section 1312 in addition to the explicit update transmission control section 1311. The explicit path property processing section 1312 makes a decision as to whether or not an EXPLICIT UPDATE message received by the router 1B includes an explicit path property. In addition, the explicit path property processing section 1312 processes the explicit path property if included in the received EXPLICIT UPDATE message.

The explicit path property processing section 1312 determines a transmission destination of the EXPLICIT UPDATE message based on the explicit path property and the explicit path information, thus notifying it to the explicit update transmission control section 1311. In addition, the explicit path property processing section 1312 provides the explicit update transmission control section 1311 with an instruction for stopping the transmission of the EXPLICIT UPDATE message based on the explicit path property.

The explicit path property processing section 1312 is capable of instructing the explicit update transmission control section 1311 to transmit a plurality of EXPLICIT UPDATE messages each having the different explicit path information based on the explicit path property. In this case, the explicit path property processing section 1312 instructs the explicit update transmission control section 1311 to provides the topology information exchange section 111 with an instruction for transmitting the EXPLICIT UPDATE message.

Figure 12:
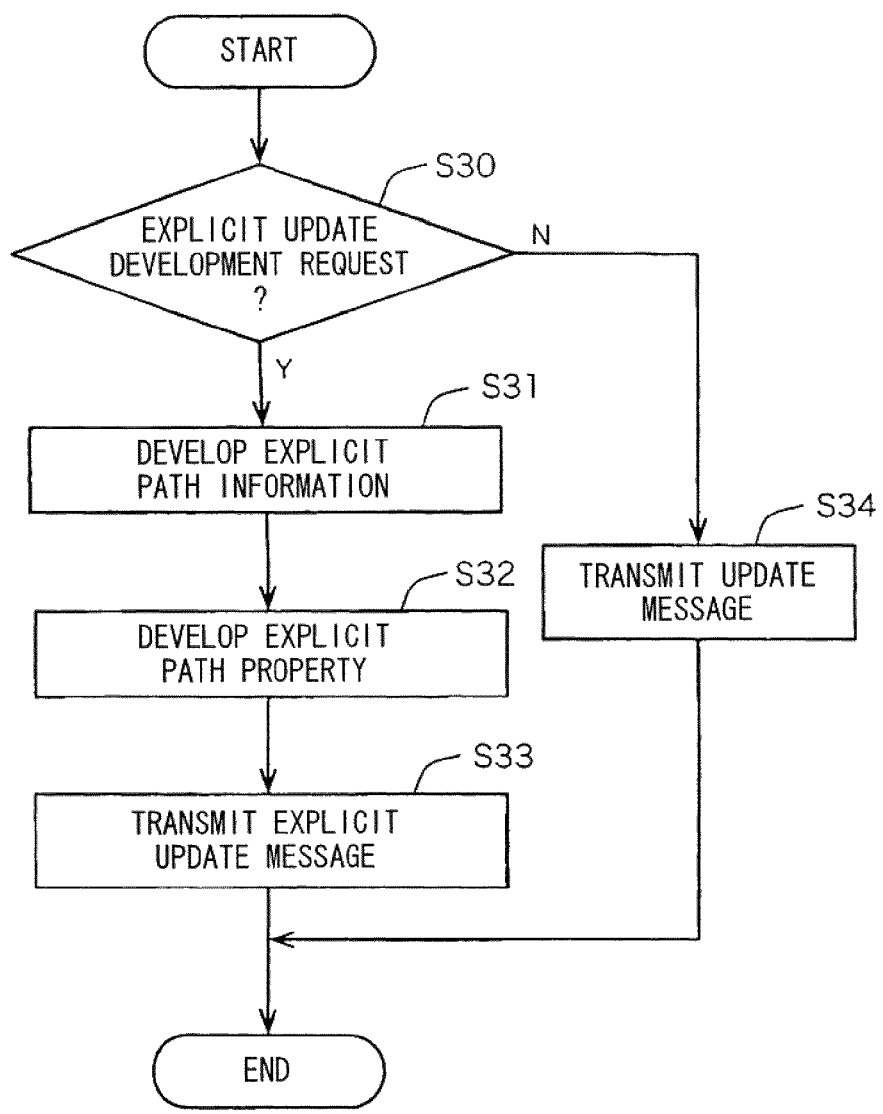
FIG. 12 is a flowchart used for explaining a part of the processing of the router for developing and transmitting an EXPLICIT UPDATE message.

Next, the processing of the router 1B will be described in detail. FIG. 12 is a flowchart used for explaining a part of the processing of the router 1B for developing and transmitting an UPDATE message or an EXPLICIT UPDATE message by way of traffic engineering. The overall operation of the router 1B in a normal mode is similar to operations of conventional routers.

When the router 1B performs traffic engineering (or when the router 1B is controlled to perform traffic engineering), the topology information exchange section 111 of the path control unit 11 makes a decision whether to transmit an EXPLICIT UPDATE message or an UPDATE message in step S30. When the decision result of step S30 is "YES" indicating a transmission request of the EXPLICIT UPDATE message, the router 1B proceeds to step S31. When the decision result of step S30 is "NO" indicating a transmission request of the UPDATE message, the router 1B proceeds to step S34.

Upon the transmission request of the EXPLICIT UPDATE message, the explicit path information development section 1111 of the topology information exchange section 111 of the path control unit 11 develops the explicit path information including an explicit path and an explicit path length in step S31. The explicit path property development section 1112 develops an explicit path property with respect to the explicit path information in step S32.

The topology information exchange section 111 develops an EXPLICIT UPDATE message including the explicit path information developed by the explicit path information development section 1111 and the explicit path property developed by the explicit path property development section 1112, and then the topology information exchange section 111 transmits the EXPLICIT UPDATE message to a peer designated by the explicit path information in step S33.

Without the transmission request of the EXPLICIT UPDATE message, the router 1B proceeds to the transmission of the UPDATE message in step S34.

Figure 13:
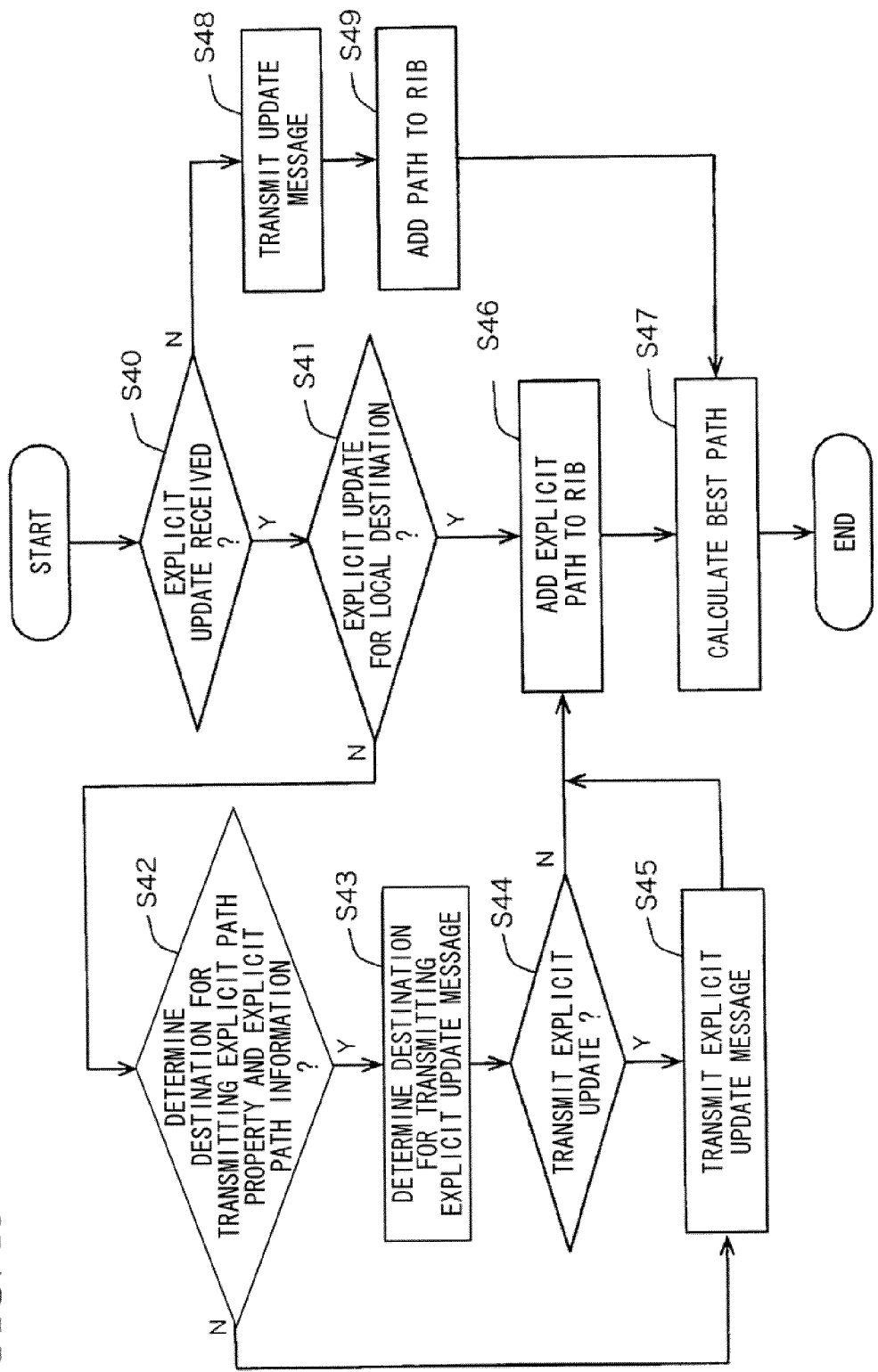
FIG. 13 is a flowchart used for explaining another part of the processing of the router for calculating a best path based on a received EXPLICIT UPDATE message.

FIG. 13 is a flowchart used for explaining another part of the processing of the router 1B for calculating a best path based on an EXPLICIT UPDATE message or an UPDATE message. The overall operation of the router 1B in a normal mode is similar to operations of conventional routers.

In step S40, the UPDATE message control section 13 makes a decision as to whether the router 1B receives an EXPLICIT UPDATE message or an UPDATE message. The router 1B proceeds to step S41 when receiving the EXPLICIT UPDATE message so that the decision result of step S40 is "YES". Alternatively, the router 1B proceeds to step S48 when receiving the UPDATE message so that the decision result of step S40 is "NO".

Upon reception of the EXPLICIT UPDATE message, the EXPLICIT UPDATE message control section 131 makes a decision as to whether or not the EXPLICIT UPDATE message is destined to the router 1B in step S41. The router 1B proceeds to step S46 when the decision result of step S41 is "YES" indicating that the EXPLICIT UPDATE message is destined to the router 1B. Alternatively, the router 1B proceeds to step S42 when the decision result of step S41 is "NO" indicating that the EXPLICIT UPDATE message is not destined to the router 1B.

In step S42, the explicit path property processing section 1312 of the EXPLICIT UPDATE message control section 131 processes the explicit path property, thus making a decision whether to determine the transmission destination of the EXPLICIT UPDATE message based on the explicit path information and the explicit path property. When the decision result of step S42 is "YES", the router 1B proceeds to step S43 so that the transmission destination of the EXPLICIT UPDATE message is determined based on the explicit path information and the explicit path property. When the decision result of step S42 is "NO", the router 1B proceeds to step S45 so that the transmission destination of the EXPLICIT UPDATE message is not determined based on the explicit path information and the explicit path property.

In step S43, the explicit path property processing section 1312 of the EXPLICIT UPDATE message control section 131 determines the transmission destination of the EXPLICIT UPDATE message based on the explicit path information and the explicit path property. In this case, the router 1B may determine to stop transmitting the EXPLICIT UPDATE message as necessary.

After completion of step S43, the router 1B proceeds to step S44 in which the explicit update transmission control section 1311 of the EXPLICIT UPDATE message control section 131 makes a decision whether to transmit the EXPLICIT UPDATE message to a peer designated by the explicit path information. When the decision result of step S44 is "YES", the router 1B proceeds to step S45 so that the EXPLICIT UPDATE message is transmitted to the peer. When the decision result of step S44 is "NO", the router 1B proceeds to step S46 so that the EXPLICIT UPDATE message is not transmitted to the peer.

In step S45, the topology information exchange section 111 of the path control unit 11 proceeds to the transmission of the EXPLICIT UPDATE message. The router 1B proceeds to step S46 after completion of step S45. In addition, the router 1B also proceeds to step S46 when the decision result of step S41 is "YES" indicating that the EXPLICIT UPDATE message is destined to the router 1B or when the decision result of step S44 is "NO" indicating that the transmission of the EXPLICIT UPDATE message is terminated. In step S46, the topology information exchange section 111 adds a new explicit path, which is determined based on the EXPLICIT UPDATE message, to the path table 14, thus updating the contents of the path table 14.

After completion of step S46, the router 1B proceeds to step S47 in which the best path calculation section 113 of the path control unit 11 calculates a best path and a next hop with respect to the prefix of the destination address. Then, the best path calculation section 113 registers the best path and the next hop with the used path table 123 of the packet transfer unit 12.

In step S47, the best path calculation section 113 may select an explicit path suited to the priority policy (which is managed by the policy management section 112 of the path control unit 11) as the best path. The best path calculation section 113 is capable of calculating a plurality of best paths and next hops with respect to the same prefix of the destination address, thus registering them with the used path table 123. In this case, the routing processing section 122 of the packet transfer unit 12 selects one of the best paths and next hops for use in the transmission of the EXPLICIT UPDATE message.

When the decision result of step S40 is "NO" indicating the reception of the UPDATE message, the router 1B proceeds to step S48 in which the topology information exchange section 111 of the path control unit 11 proceeds to the transmission of the UPDATE message. Then, the router 1B proceeds to step S49 in which the topology information exchange section 111 adds a new path, which is determined based on the UPDATE message, to the path table 14, thus updating the contents of the path table 14.

The second embodiment allows a repeater node to develop an explicit path by use of the explicit path property in a flexible manner. This is a big difference between the first and second embodiments. In the case of an EXPLICIT UPDATE message which includes the explicit path information indicating the explicit path and the explicit path property indicating "loose", the second embodiment allows the repeater node to freely select any node departing from on the explicit path although the destination address should not be changed.

3. Third Embodiment

Next, a third embodiment of the present invention will be described with respect to the processing of a node which is adapted to a network including a node incapable of recognizing the explicit path information and which receives an EXPLICIT UPDATE message whose explicit path information is irrelevant thereto. This processing of a node is executed upon reception of an EXPLICIT UPDATE message which includes the explicit path information indicating the explicit path and the explicit path property indicating "strict". This processing according to the third embodiment is applicable to both the router 1A of the first embodiment and the router 1B of the second embodiment.

Figure 14:
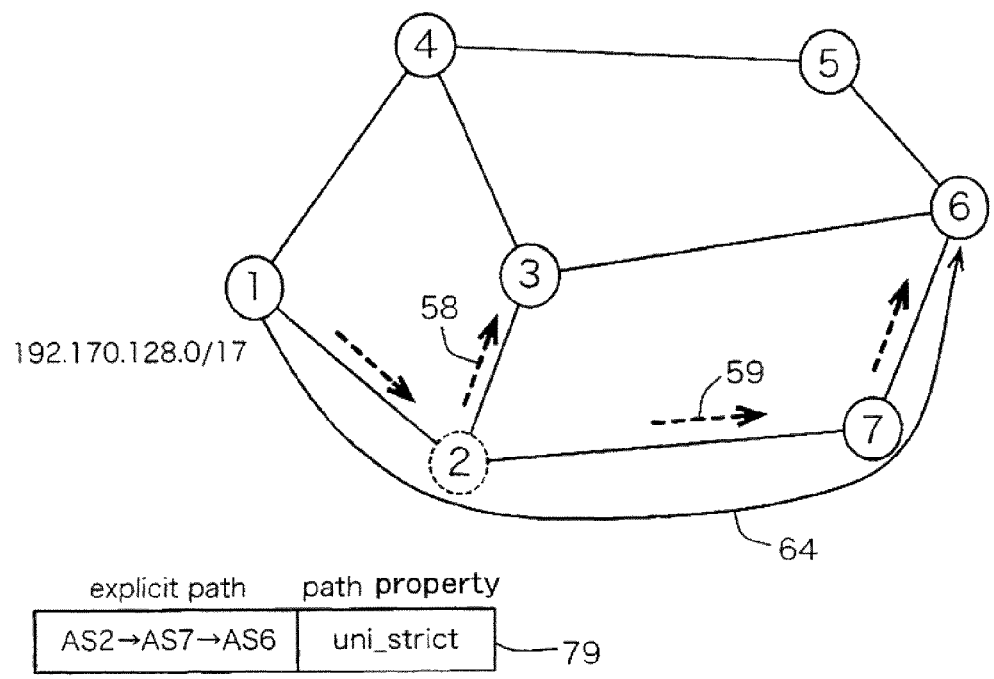
FIG. 14 shows a network configured to transmit an EXPLICIT UPDATE message through an explicit path consisting of nodes including a node incapable of recognizing the explicit path information.

FIG. 14 shows a network, including a node incapable of recognizing the explicit path information, configured to transmit an EXPLICIT UPDATE message via the explicit path designated by the explicit path information. Herein, the AS2 drawn with a dotted circuit is a node incapable of recognizing the explicit path information included in the EXPLICIT UPDATE message.

The AS1 develops an EXPLICIT UPDATE message 79 which includes the explicit path information indicating an explicit path of AS2→AS7→AS6 (see a curved arrow 64) and the explicit path property indicating "uni_strict". The AS1 transmits the EXPLICIT UPDATE message 79 to a peer corresponding to the AS2.

The explicit path information is of an option attribute of the path attribute information and is accompanied with a transmission flag. For this reason, the AS2 (which is incapable of recognizing the explicit path information) regards the EXPLICIT UPDATE message 79 including the explicit path information as an UPDATE message, which is thus normally transferred to another peer. In FIG. 14, the AS2 directly transfers the EXPLICIT UPDATE message 79 to the AS3 and the AS7 (see dotted arrows 58 and 59).

The AS7 acknowledges the reception of the EXPLICIT UPDATE message 79 transferred from the AS2. The AS7 also acknowledges that the explicit path information is relevant thereto on the basis of the explicit path and the explicit path property included in the EXPLICIT UPDATE message 79. That is, the AS7 transfers the EXPLICIT UPDATE message 79 to the AS6 through the explicit path. Thus, the AS6 receives the EXPLICIT UPDATE message 79 which is destined thereto.

On the other hand, the AS3 acknowledges the reception of the EXPLICIT UPDATE message 79 transferred from the AS2. Although the AS3 acknowledges that the EXPLICIT UPDATE message 79 is irrelevant thereto, the AS3 acknowledges that the explicit path information indicates the explicit path of AS2→AS7→AS6, and the explicit path property indicates "uni_strict". In this case, the AS3 discards the EXPLICIT UPDATE message 79, thus stopping the further transmission of the EXPLICIT UPDATE message 79. That is, the AS3 is controlled to stop further transferring the EXPLICIT UPDATE message 79 to another node.

Figure 15:
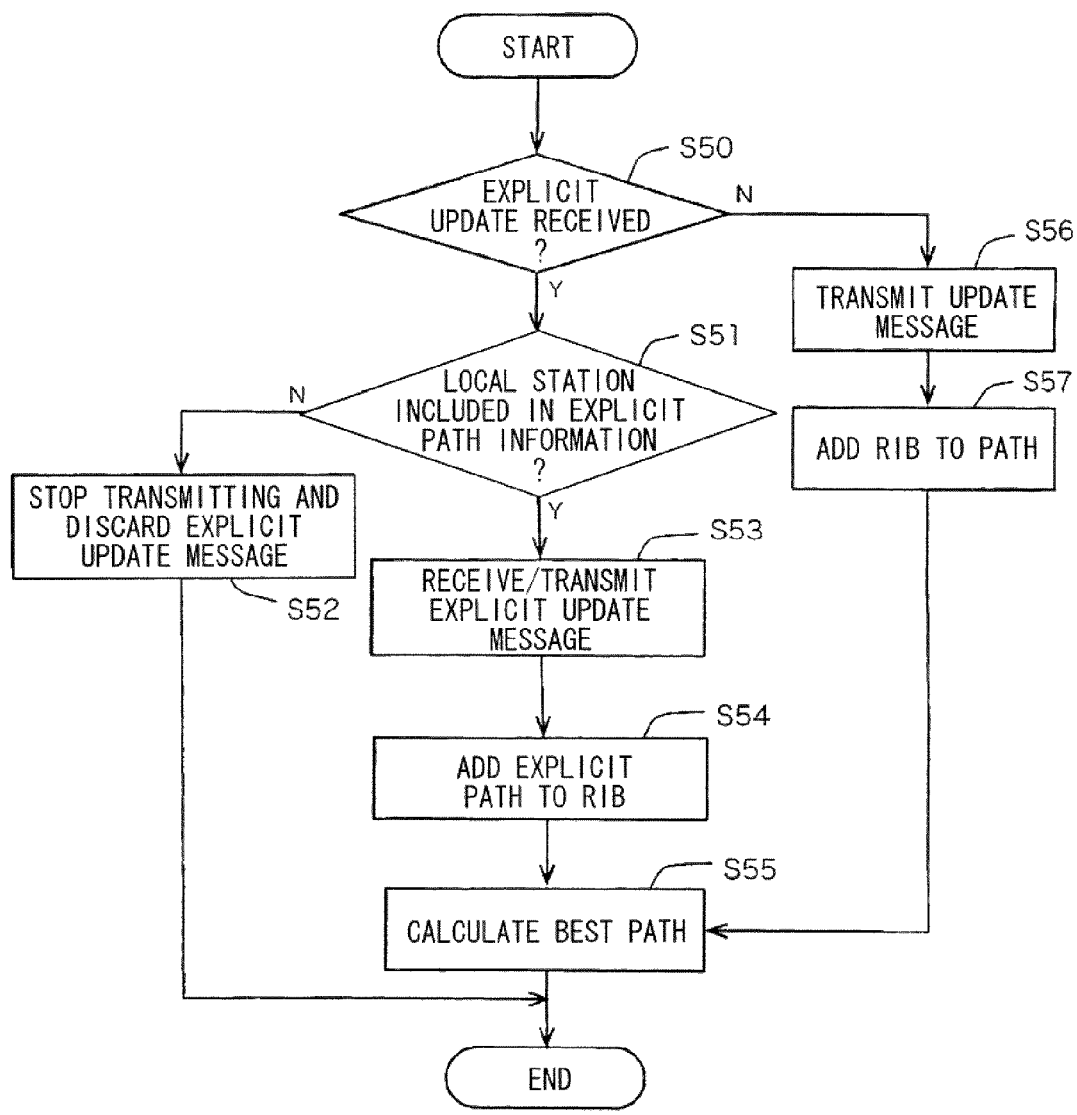
FIG. 15 is a flowchart used for explaining the processing of a router for calculating a best path with respect to an EXPLICIT UPDATE message including the explicit path information indicating the explicit path in accordance with a third embodiment of the present invention.

Next, the processing adapted to the third embodiment will be described with reference to FIG. 15. FIG. 15 is a flowchart used for explaining the processing of the router 1A upon reception of an EXPLICIT UPDATE message including the explicit path information indicating the explicit path and used for explaining the processing of the router 1B upon reception of an EXPLICIT UPDATE message which includes the explicit path information indicating the explicit path and the explicit path property indicating "strict".

First, the router 1A or 1B proceeds to step S50 in which the UPDATE message control unit 13 makes a decision whether to receive an UPDATE message or an EXPLICIT UPDATE message. The router 1A or 1B proceeds to step S51 when the decision result of step S50 is "YES" indicating the reception of the EXPLICIT UPDATE information. Alternatively, the router 1A or 1B proceeds to step S56 when the decision result of step S50 is "NO" indicating the reception of the UPDATE message.

In step S51, the EXPLICIT UPDATE message control section 131 makes a decision as to whether or not the present node (i.e. the router 1A or 1B) is designated by the explicit path information included in the EXPLICIT UPDATE message. The router 1A or 1B proceeds to step S53 when the decision result of step S51 is "YES" indicating that the present node is designated by the explicit path information. Alternatively, the router 1A or 1B proceeds to step S52 when the decision result of step S51 is "NO" indicating that the present node is not designated by the explicit path information.

In step S52, the EXPLICIT UPDATE message control section 131 discards the EXPLICIT UPDATE message and controls the explicit update transmission control section 1311 to stop transmitting the EXPLICIT UPDATE message.

In step S53, the router 1A or 1B proceeds to the reception/transmission of the EXPLICIT UPDATE message by way of the aforementioned procedure corresponding to step S22 shown in FIG. 6 or steps S42 to S45 shown in FIG. 13. Subsequently, the topology information exchange section 111 adds a new explicit path, which is determined based on the EXPLICIT UPDATE message, to the path table 14, thus updating the contents of the path table 14 in step S54.

After completion of step S54, the router 1A or 1B proceeds to step S55 in which the best path calculation section 113 calculates a best path and a next hop with respect to the prefix of the destination address. The best path calculation section 113 registers the best path and the next hop with the used path table 123 of the packet transfer unit 12.

The best path calculation section 113 is capable of selecting an explicit path suited to the priority policy, which is managed by the policy management section 112 of the path control unit 11, as the best path. In addition, the best path calculation section 113 is capable of calculating a plurality of best paths and next hops with respect to the same prefix of the destination address, thus registering them with the used path table 123. In this case, the routing processing section 122 of the packet transfer unit 12 selects one of the best paths and next hops for use in the transmission of the EXPLICIT UPDATE message.

In step S56, the topology information exchange section 111 of the path control unit 11 proceeds to the transmission of the UPDATE message. In step S57, the topology information exchange section 111 adds a new path, which is determined based on the UPDATE message, to the path table 14, thus updating the contents of the path table 14.

As described above, the third embodiment checks whether or not the present node is designated by the explicit path information, wherein the present node discards the EXPLICIT UPDATE message which is transferred from a node incapable of recognizing the explicit path information and which is not destined thereto. Thus, it is possible to prevent numerous EXPLICIT UPDATE messages from being unnecessarily notified to numerous nodes, thus stabilizing the network.

4. Path Control System

Figure 16:
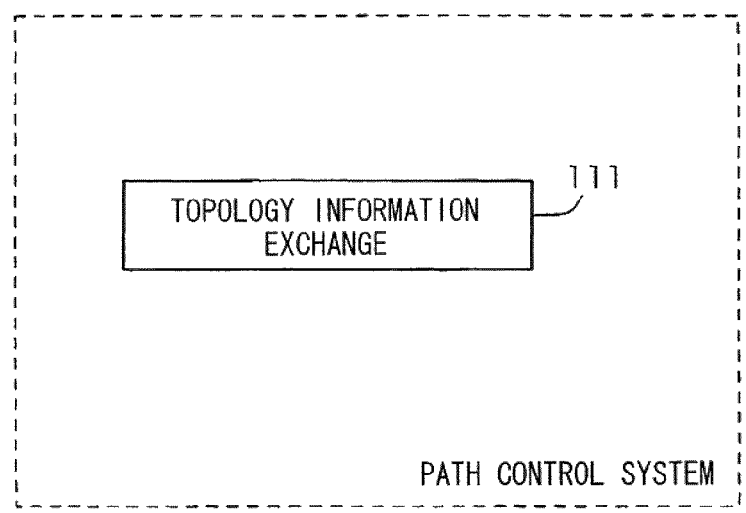
FIG. 16 is a block diagram simply showing a minimum structure of a path control system.
Figure 17:
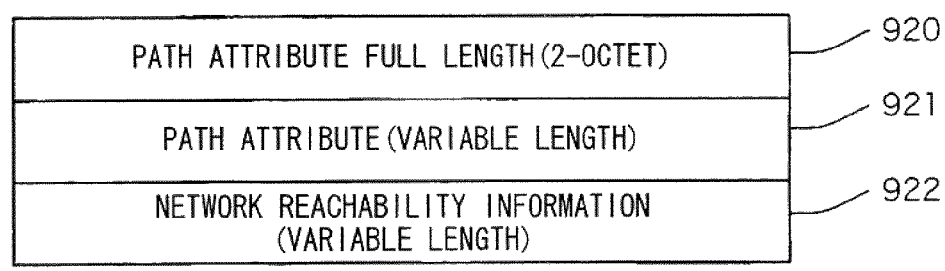
FIG. 17 shows a part of a packet format of an UPDATE message included in the path control information for use in a path control procedure of a border gateway protocol.
Figure 18:
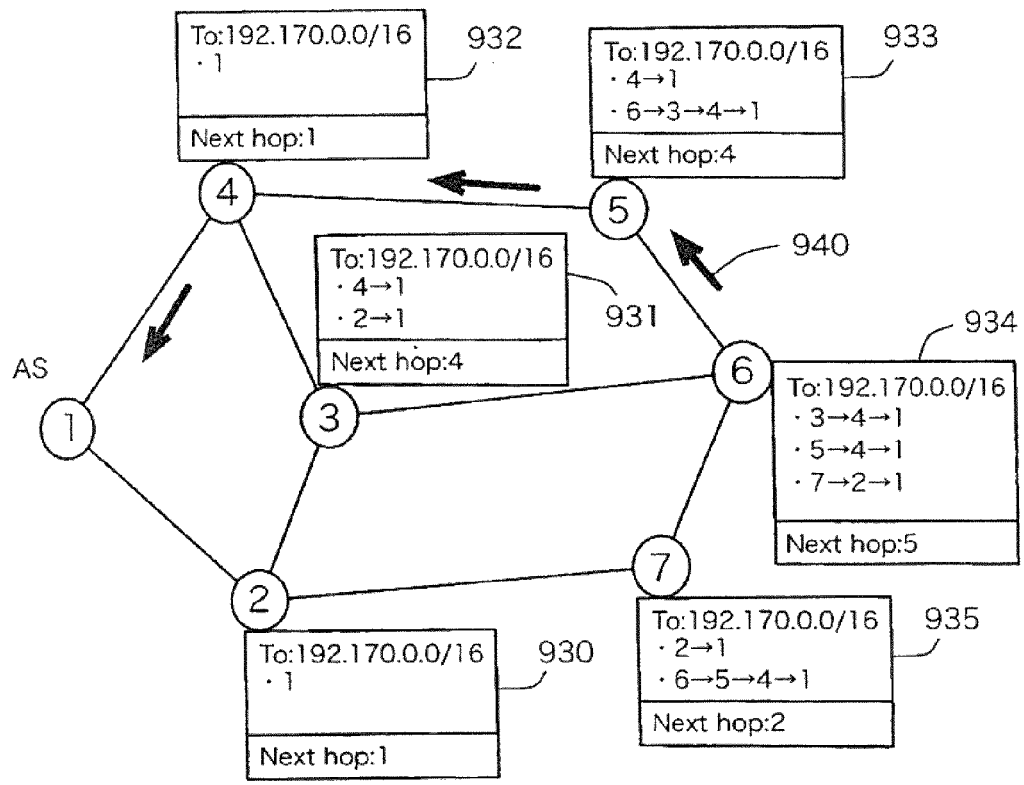
FIG. 18 is a diagram used for explaining a packet transfer procedure adapted to a path control procedure of a path-vector control protocol.
Figure 19:
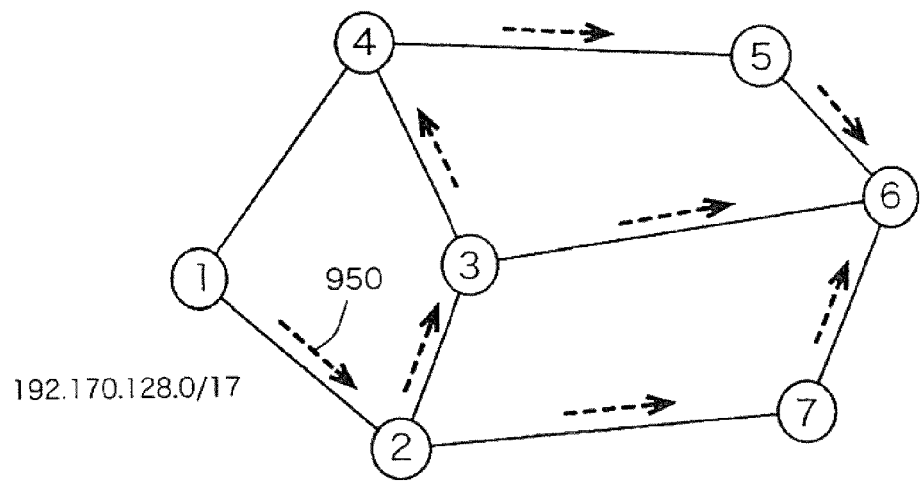
FIG. 19 is a diagram used for explaining the technical feature of traffic engineering and an increasing UPDATE message.

Next, a minimum structure of a path control system according to the present invention will be described with reference to FIG. 16. As shown in FIG. 16, the path control system of the present invention includes at least the topology information exchange section 111.

The topology information exchange section 111 develops a path control message including the regional information for designating a prescribed region of transmission.

Employing the minimum structure of the path control system reduces the load for processing path control messages in the network, thus stabilizing the network.

5. Technical Features

Next, the technical features demonstrated by the path control method and system according to the present invention will be described below.

(1) The path control method includes a procedure for developing a path control message (e.g. an EXPLICIT UPDATE message) including the regional information (e.g. the explicit path information 211) for designating a prescribed region of transmission.

(2) In the above procedure, it is possible to develop a path control message including the regional information for designating a path or an explicit path.

(3) The path control method includes a procedure for receiving the path control message and the procedure for transmitting the path control message along the path.

(4) When a plurality of regions and paths are designated by the regional information included in the path control message, it is possible to transmit the path control message along plural paths.

(5) It is possible to develop a path control message including the regional information for designating the number of hops (e.g. an explicit path length).

(6) In the above, the path control method includes a procedure for receiving the path control message, and a procedure for making a decision whether to transmit the path control message to a destination node based on the number of hops.

(7) It is possible to develop a path control message including a regional property (e.g. the explicit path property 212) for instructing a node receiving the path control message how to process the regional information.

(8) It is possible to develop a path control message including the regional property for designating the strict processing (e.g. "multi_strict") of the regional information.

(9) In the above, the path control method includes a procedure for receiving the path control message, and a procedure for selecting a destination node or for stopping the further transmission of the path control message when the regional property designates the flexible processing of the regional information.

(10) In the above, it is possible to transmit the path control message to the selected destination node.

(11) The path control method includes a procedure for making a decision as to whether or not the regional information designates a present node receiving the path control message, and a procedure for discarding the path control message when the regional information does not designate the present node.

(12) In the above, it is possible to make a decision whether or not the present node is included in the path designated by the regional information.

(13) The path control method includes a procedure for calculating as a best path a priority path selected for the transmission of the path control message.

(14) The path control system includes a device (e.g. the topology information exchange section 111) for developing a path control message (e.g. an EXPLICIT UPDATE path) including the regional information.

(15) In the above, it is possible to develop a path control message including the regional information for designating a path or an explicit path.

Lastly, it is apparent that the present invention is not limited to the above embodiments, but may be modified and changed without departing from the scope and spirit of the invention.

What is claimed is:

1. A path control method for autonomous routing within a communication network, said path control method comprising:
    developing, by a router, a path control message including regional information designating a specific region of transmission to which the path control message is destined via an explicit path, the path control message further including an explicit path length specifying a number of hops to limit transfer of the path control message;
    instructing, by the router, a node receiving the path control message, among a plurality of nodes within the communication network, to transmit the path control message based on the regional information and to determine a best path, where a reverse direction of the explicit path has priority in determination of the best path; and
    in response to receiving the path control message, transmitting, by the node, data along best path.

2. The path control method of claim 1, wherein the path control message is transmitted through a plurality of paths designated by the regional information.

3. The path control method of claim 1, wherein the path control message includes a regional property instructing each node receiving the path control message with respect to processing of the regional information.

4. The path control method of claim 3, wherein the regional property designates strict processing of the region information.

5. The path control method of claim 4, further comprising:
    selecting a destination node or terminating further transmission of the path control message where the regional property designates flexible processing of the regional information.

6. The path control method of claim 5, wherein the path control message is transmitted to the destination node that has been selected.

7. The path control method of claim 1, further comprising:
    determining whether or not the regional information designates the node receiving the path control message; and,
    discarding the path control message where the node receiving the path control message is not designated by the regional information.

8. The path control method of claim 7, wherein determination as to whether or not the region information designates the node receiving the path control message is based on a path designated by the regional information.

9. The path control method of claim 1, wherein a priority path that is determined in advance is selected as a best path for transmission of the path control message.

10. A path control system comprising:
    a router transmitting a path control message including regional information designating a specific region of transmission to which the path control message is destined via an explicit path, the path control message further includes an explicit path length specifying a number of hops to limit transfer of the path control message;
    a node upon receiving the path control message transmitted by the router, determines from the path control message a best path to forward the path control message to another node which is in accordance with a priority policy regarding explicit path.

11. A path control device comprising:
    hardware configured to create a path control message including regional information designating the specific region of transmission to which the path control message is designated via an explicit path the path message further including an explicit path length specifying the number of hops to limit the transfer of the path control message; and
    a network interface configured to transmit the path control message to a node,
    wherein the node upon receipt of the path control message is to determine from the path control message a best path along which to transmit the path control message from the node, the best path determined by the node in accordance with a priority policy regarding the explicit path, and the node is further to transmit the path control message by the node along the best path.

12. A non-transitory computer-readable data storage medium storing instructions executable by a router to perform the following:
    developing a path control message including regional information designating a specific region of transmission to which the path control message is destined via an explicit path, the path control message further including an explicit path length specifying a number of hops to limit transfer of the path control message; and
    transmitting the path control message to a node;
    wherein the node upon receipt of the path control message is to determine from the path control message a best path along which to transmit the path control message from the node, the best path determined by the node in accordance with a priority policy regarding the explicit path, and the node is further to transmit the path control message by the node along the best path.

* * * * *